(12) United States Patent
Baek et al.

(10) Patent No.: US 10,135,657 B2
(45) Date of Patent: *Nov. 20, 2018

(54) APPARATUS AND METHOD FOR SENDING AND RECEIVING BROADCAST SIGNALS

(71) Applicant: LG ELECTRONICS INC., Seoul (KR)

(72) Inventors: Jongseob Baek, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

This patent is subject to a terminal disclaimer.

(21) Appl. No.: 15/676,325

(22) Filed: Aug. 14, 2017

(65) Prior Publication Data

US 2017/0366384 A1 Dec. 21, 2017

Related U.S. Application Data

(63) Continuation of application No. 15/085,739, filed on Mar. 30, 2016, now Pat. No. 9,769,000.

(Continued)

(51) Int. Cl.
*H04L 5/12* (2006.01)
*H04L 23/02* (2006.01)
(Continued)

(52) U.S. Cl.
CPC ....... *H04L 27/2646* (2013.01); *H04B 7/0413* (2013.01); *H04H 20/57* (2013.01);
(Continued)

(58) Field of Classification Search
CPC ............. H04L 27/2646; H04L 27/2601; H04L 27/2649; H04L 27/2655; H04L 1/0071;
(Continued)

(56) References Cited

U.S. PATENT DOCUMENTS 6,289,000 B1 9/2001 Yonge
9,438,373 B2 9/2016 Hong et al.
(Continued)

FOREIGN PATENT DOCUMENTS

CN 102301705 A 12/2011
CN 103329514 A 9/2013
(Continued)

OTHER PUBLICATIONS

U.S. Appl. No. 15/014,838, filed Feb. 3, 2016.
U.S. Appl. No. 15/085,739, filed Mar. 30, 2016.

*Primary Examiner* — Phuong Phu
(74) *Attorney, Agent, or Firm* — Dentons US LLP

(57) ABSTRACT

A broadcast signal receiver is disclosed. A broadcast signal receiver according to an embodiment of the present invention comprises a synchronization & demodulation module performing signal detection and OFDM demodulation on a received broadcast signal; a frame parsing & deinterleaving module performing parsing and deinterleaving of a signal frame of the broadcast signal; a demapping & decoding module performing conversion of data of at least one Physical Layer Pipe (PLP) of the broadcast signal into the bit domain and FEC decoding of the converted PLP data; and an output processing module outputting a data stream by receiving the at least one PLP data.

8 Claims, 39 Drawing Sheets

Related U.S. Application Data

(60) Provisional application No. 62/193,594, filed on Jul. 17, 2015.

(51) Int. Cl.

| | | |
|---|---|---|
| *H04L 27/26* | (2006.01) | |
| *H04B 7/0413* | (2017.01) | |
| *H04H 20/57* | (2008.01) | |
| *H04H 20/72* | (2008.01) | |
| *H04H 60/07* | (2008.01) | |
| *H04H 60/91* | (2008.01) | |
| *H04N 21/61* | (2011.01) | |
| *H04N 21/2383* | (2011.01) | |
| *H04L 1/00* | (2006.01) | |

(52) U.S. Cl.
CPC ............ *H04H 20/72* (2013.01); *H04H 60/07* (2013.01); *H04H 60/91* (2013.01); *H04L 1/0071* (2013.01); *H04L 27/2601* (2013.01); *H04L 27/2649* (2013.01); *H04L 27/2655* (2013.01); *H04N 21/2383* (2013.01); *H04N 21/6112* (2013.01); *H04N 21/6131* (2013.01)

(58) Field of Classification Search
CPC ...... H04B 7/0413; H04H 20/57; H04H 20/72; H04H 60/07; H04H 60/91; H04N 21/6131; H04N 21/2383; H04N 21/6112; H03M 13/2778
USPC .................................. 375/260, 261, 262, 316
See application file for complete search history.

(56) References Cited

U.S. PATENT DOCUMENTS

| | | | |
|---|---|---|---|
| 9,769,000 B2* | 9/2017 | Baek .................. | H04L 27/2646 |
| 2009/0185632 A1 | 7/2009 | Cai et al. | |
| 2009/0207946 A1* | 8/2009 | Sebeni ............. | H03M 13/2778 |
| | | | 375/340 |
| 2011/0200128 A1 | 8/2011 | Ko et al. | |
| 2011/0317790 A1 | 12/2011 | Yokokawa et al. | |
| 2012/0069873 A1 | 3/2012 | Zheng | |
| 2013/0219431 A1 | 8/2013 | Hong et al. | |
| 2014/0010154 A1 | 1/2014 | Hong et al. | |
| 2014/0047492 A1 | 2/2014 | Song et al. | |
| 2014/0380135 A1 | 12/2014 | Hong et al. | |
| 2015/0049828 A1 | 2/2015 | Beak et al. | |
| 2015/0341054 A1 | 11/2015 | Myung et al. | |

FOREIGN PATENT DOCUMENTS

| | | |
|---|---|---|
| EP | 2239908 B1 | 3/2012 |
| EP | 2618563 A2 | 7/2013 |
| EP | 2557717 B1 | 12/2014 |
| JP | 2009112012 A | 5/2009 |
| JP | 2013502805 A | 1/2013 |
| KR | 1020080048293 A | 6/2008 |
| KR | 1020130119281 A | 10/2013 |
| KR | 1020150034934 A | 4/2015 |
| WO | 2008147053 A1 | 12/2008 |
| WO | 2011105757 A2 | 9/2011 |
| WO | 2011136574 A2 | 11/2011 |
| WO | 2015046836 A1 | 4/2015 |
| WO | 2015072791 A1 | 5/2015 |

* cited by examiner

[Figure 11]
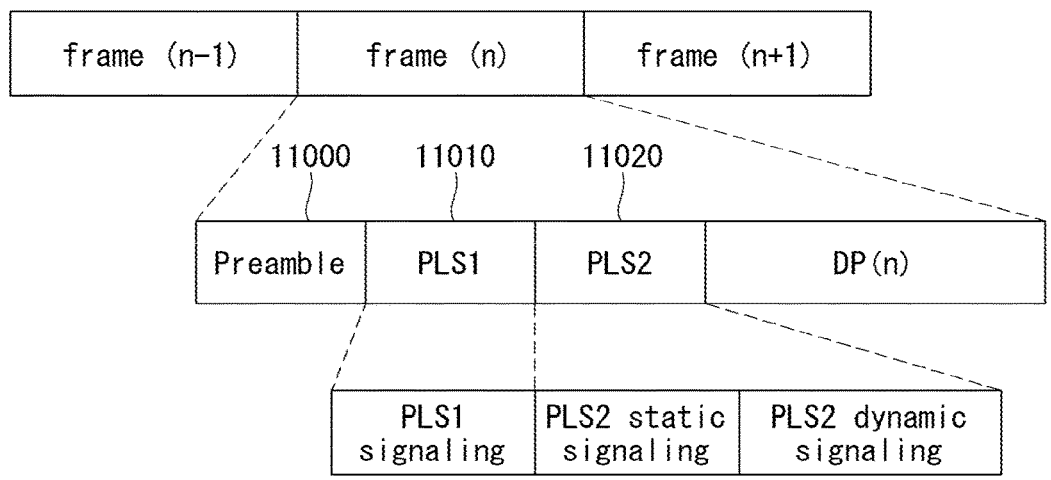
[Figure 12]
| Content | Bits |
|---|---|
| PHY_PROFILE | 3 |
| FFT_SIZE | 2 |
| GI_FRACTION | 3 |
| EAC_FLAG | 1 |
| POLOT_MODE | 1 |
| PAPR_FLAG | 1 |
| FRU_CONFIGURE | 3 |
| RESERVED | 7 |

Figure 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|   FRU_PHY_PROFILE | 3 |
|   FRU_FRAME_LENGTH | 2 |
|   FRU_GI_FRACTION | 3 |
|   RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

Figure 14

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE==TS('00') | |
| DNP_MODE | 2 |
| ISSY_MODE | 2 |
| HC_MODE_TS | 2 |
| if HC_MODE_TS=='01' or '10' | |
| PID | 13 |
| end | |
| if DP_PAYLOAD_TYPE==IP('01') | |
| HC_MODE_IP | 2 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |
| end | |

[Figure 15]

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15(or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i = 1:NUM_AUX | |
|     AUX_PRIVATE_DYN | 48 |
| end | |
| CRC 32 | 32 |

[Figure 16]
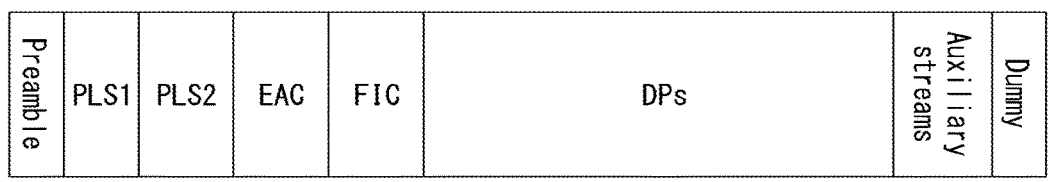
[Figure 17]
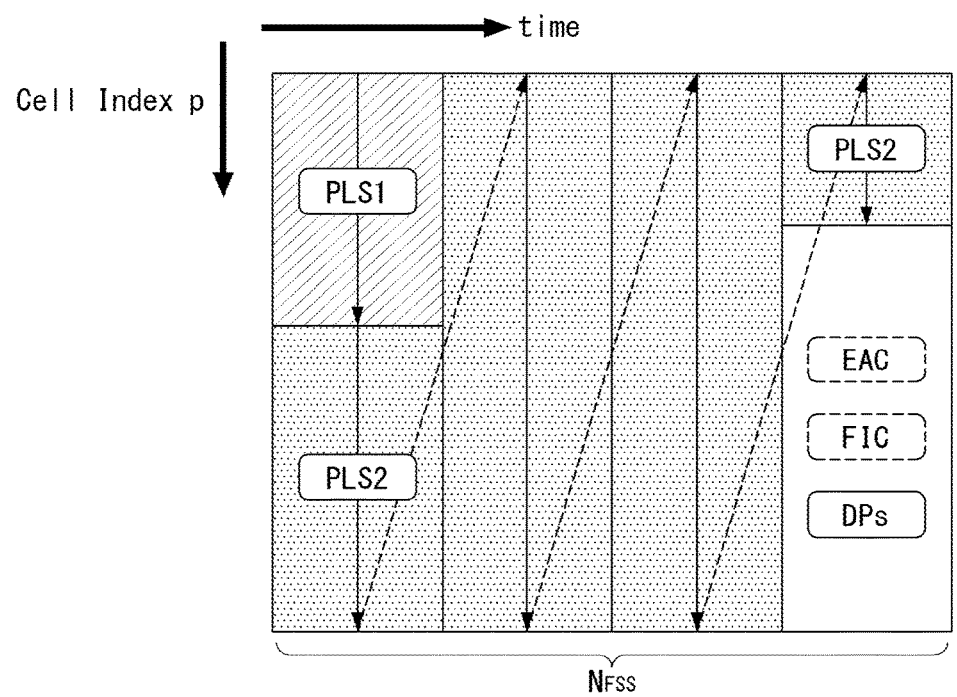

[Figure 18]
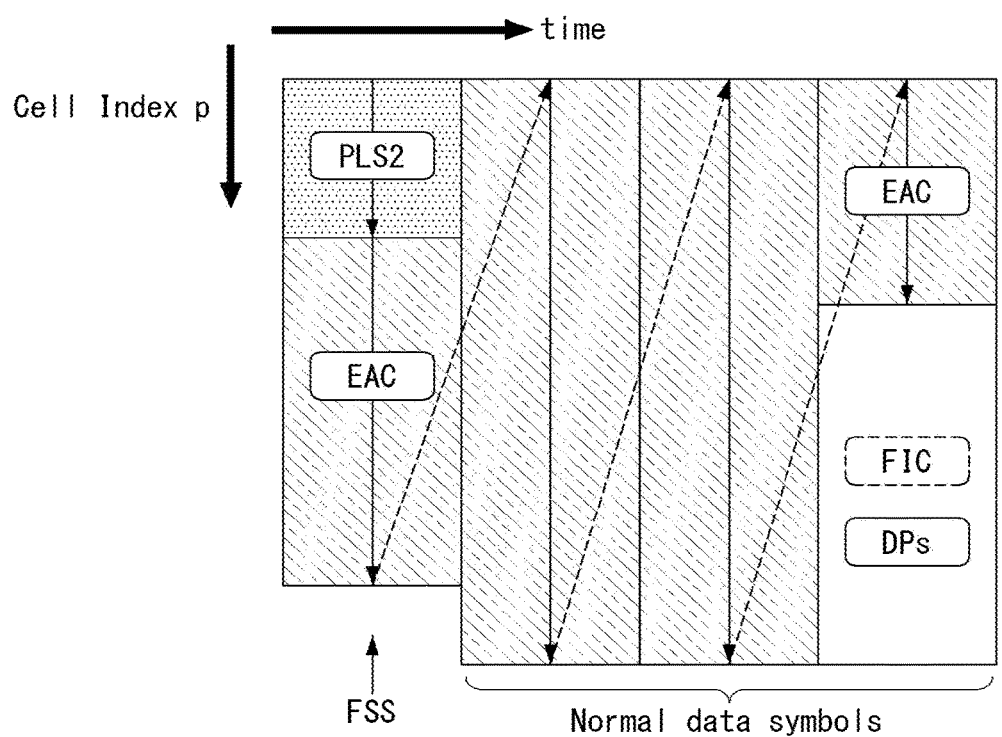

[Figure 19]
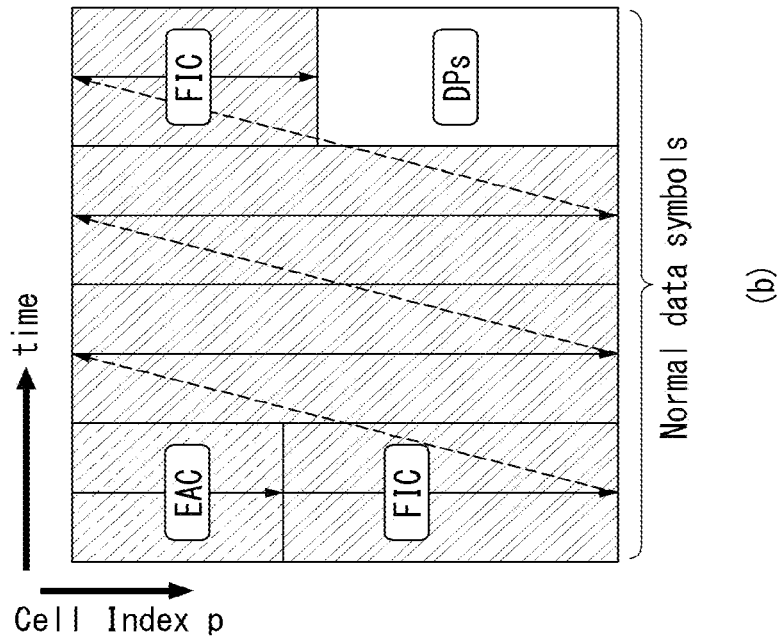
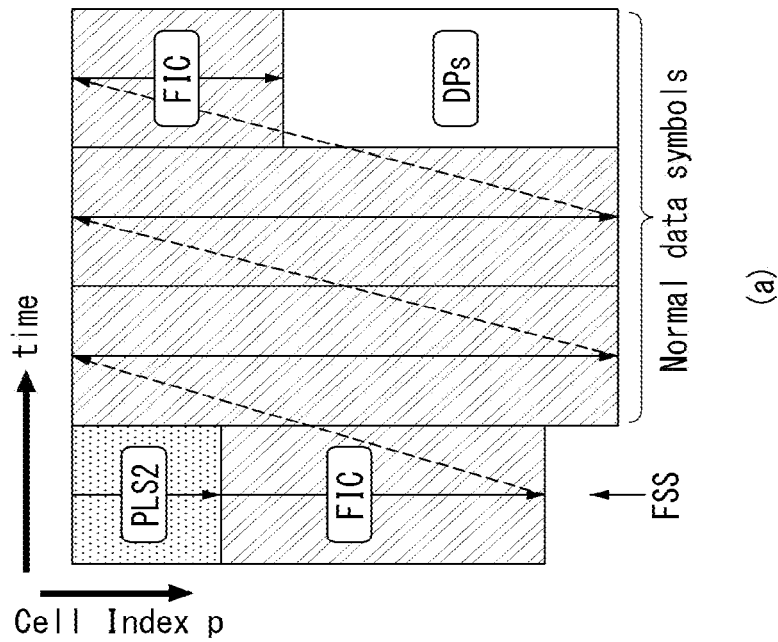

[Figure 20]
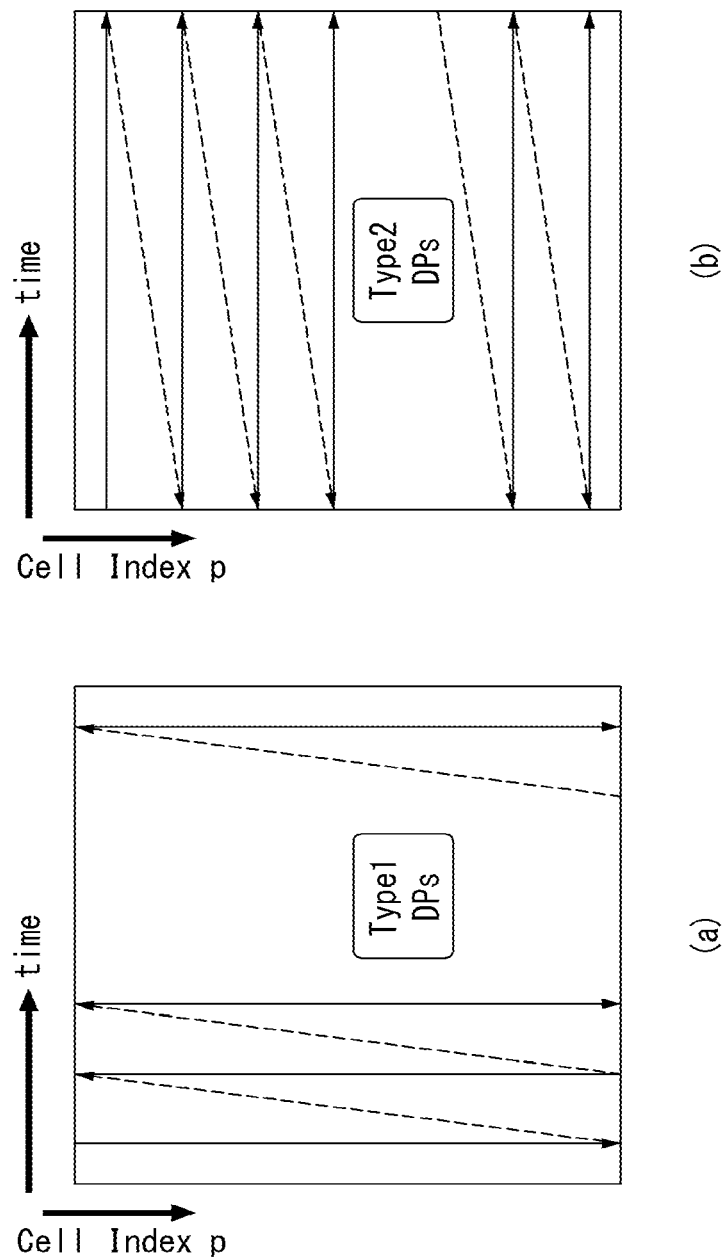

[Figure 21]
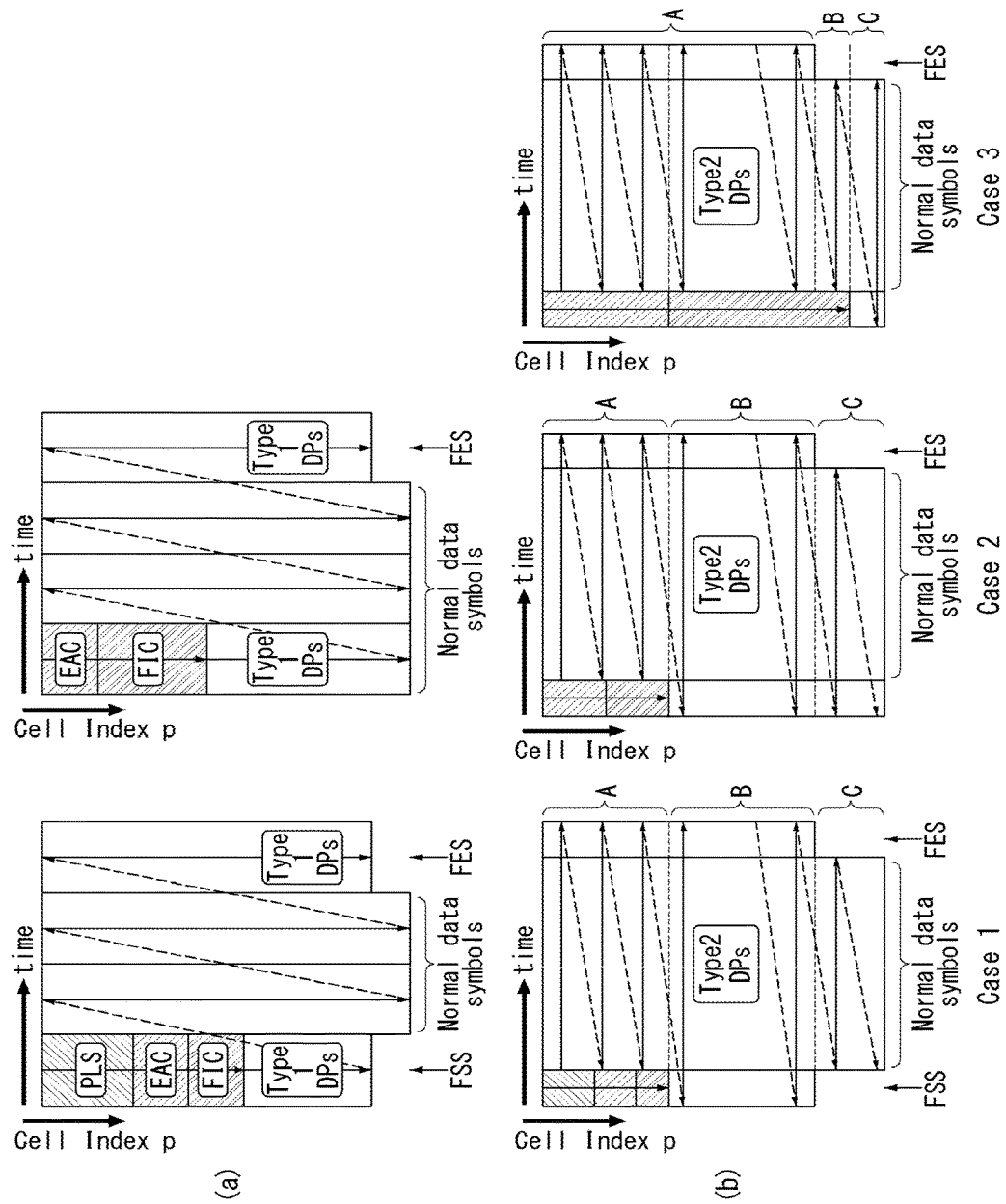

[Figure 22]
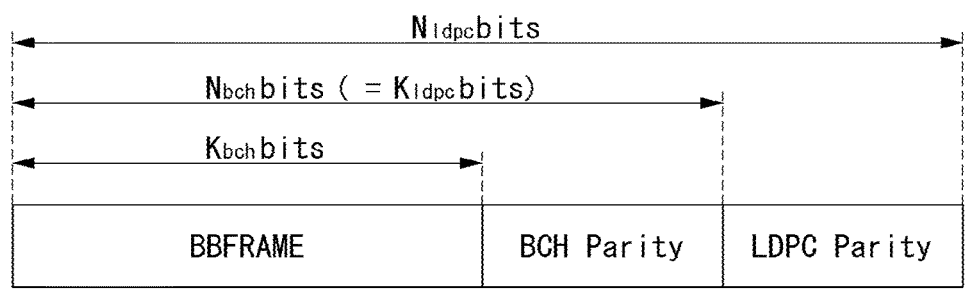

Figure 29

[Figure 32]
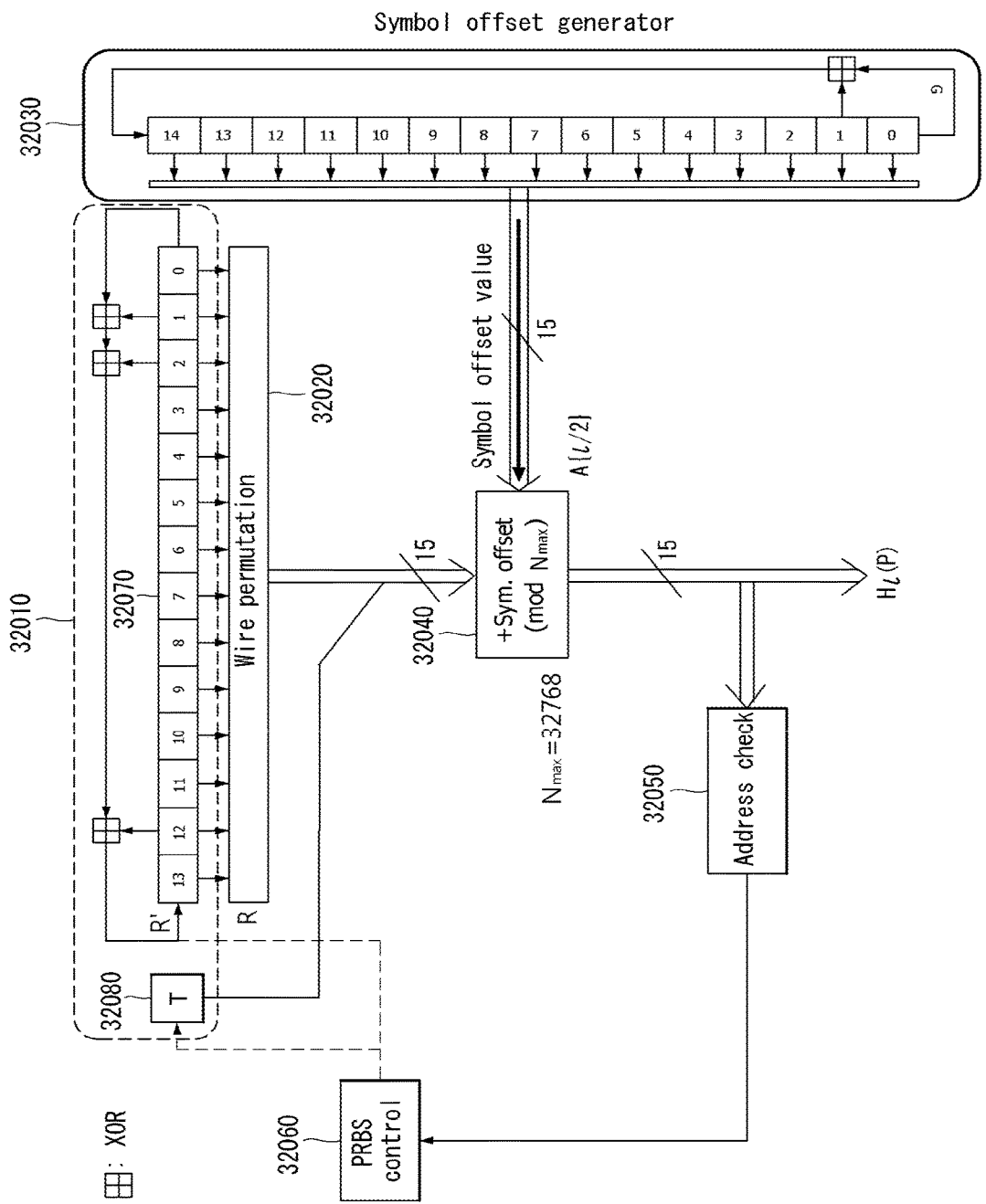

[Figure 33]
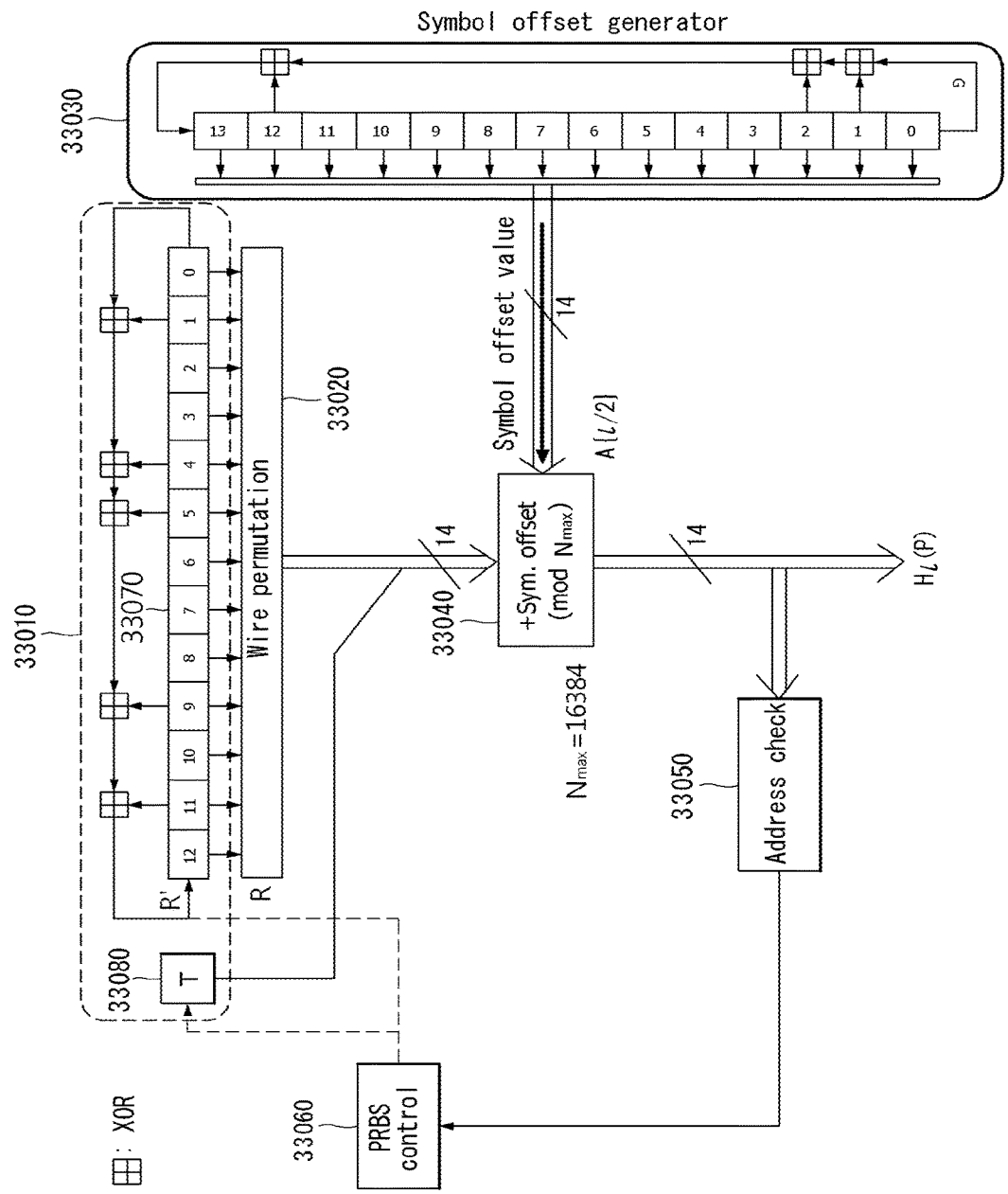

[Figure 34]
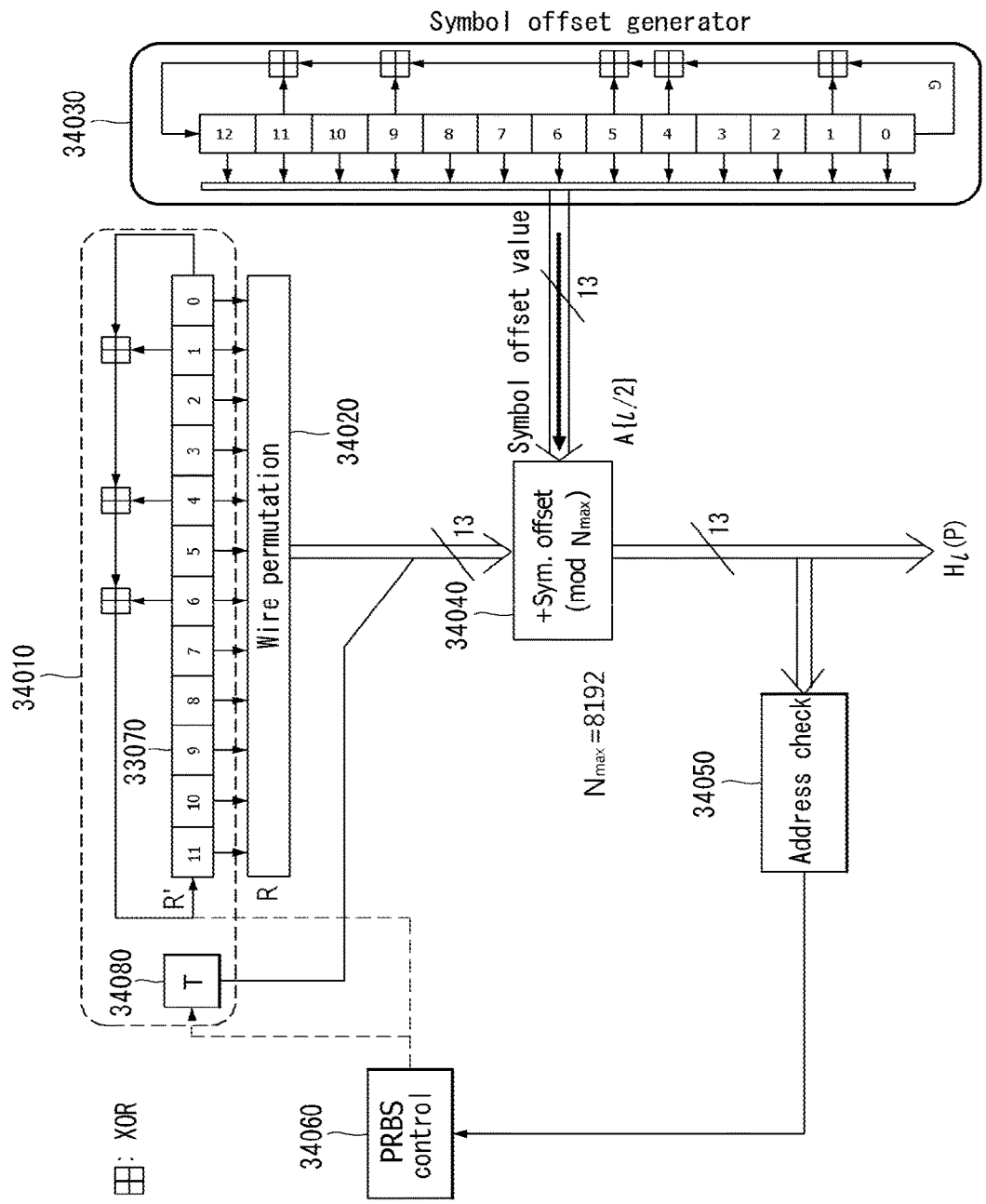

[Figure 35]
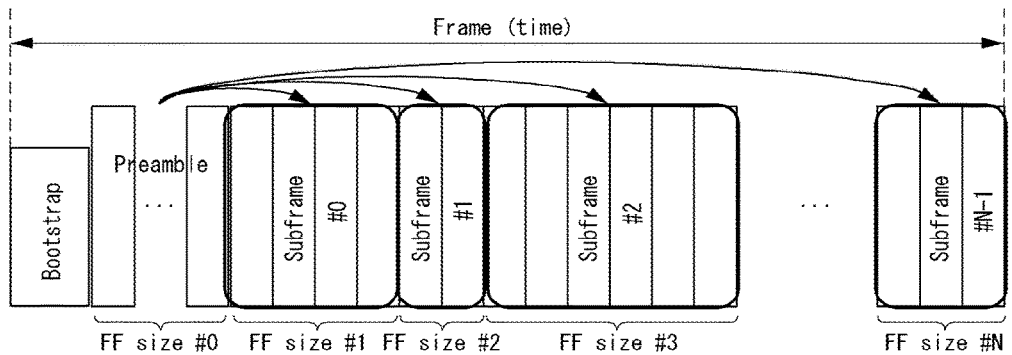
[Figure 36]
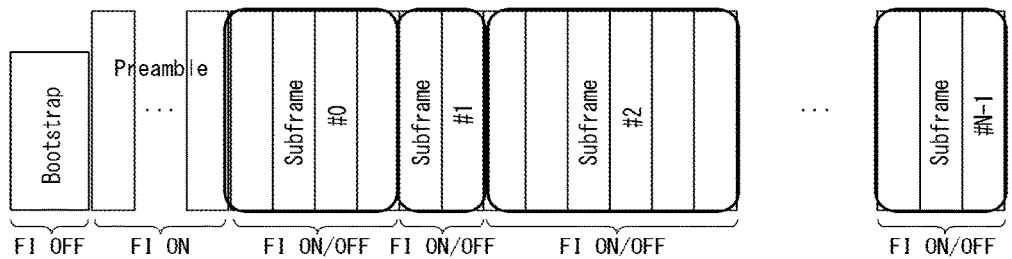
[Figure 37]
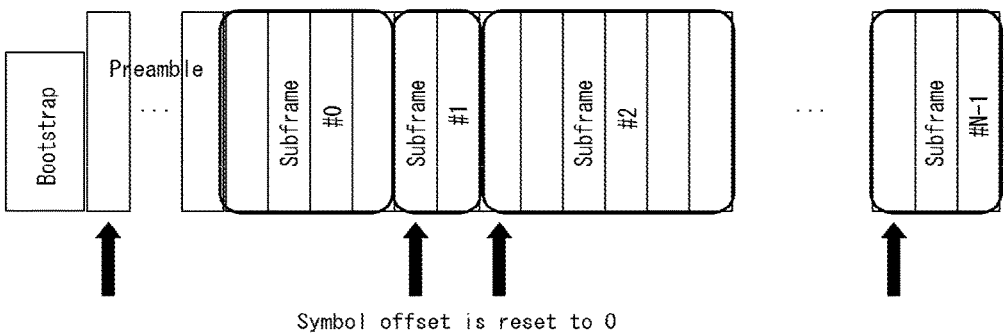

[Figure 38]
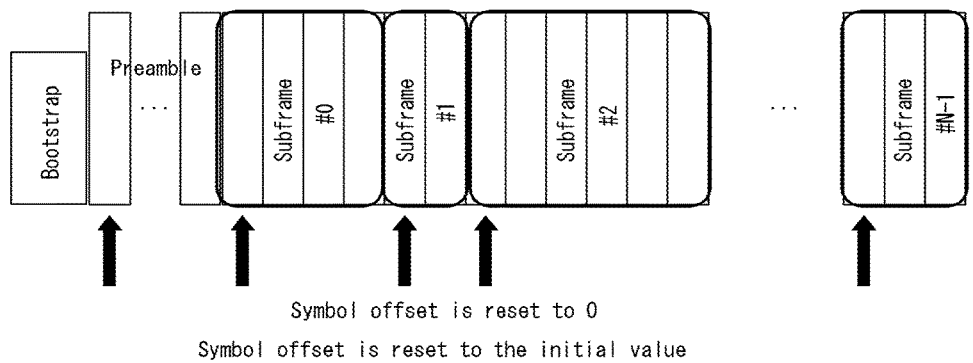
Symbol offset is reset to 0
Symbol offset is reset to the initial value
[Figure 39]
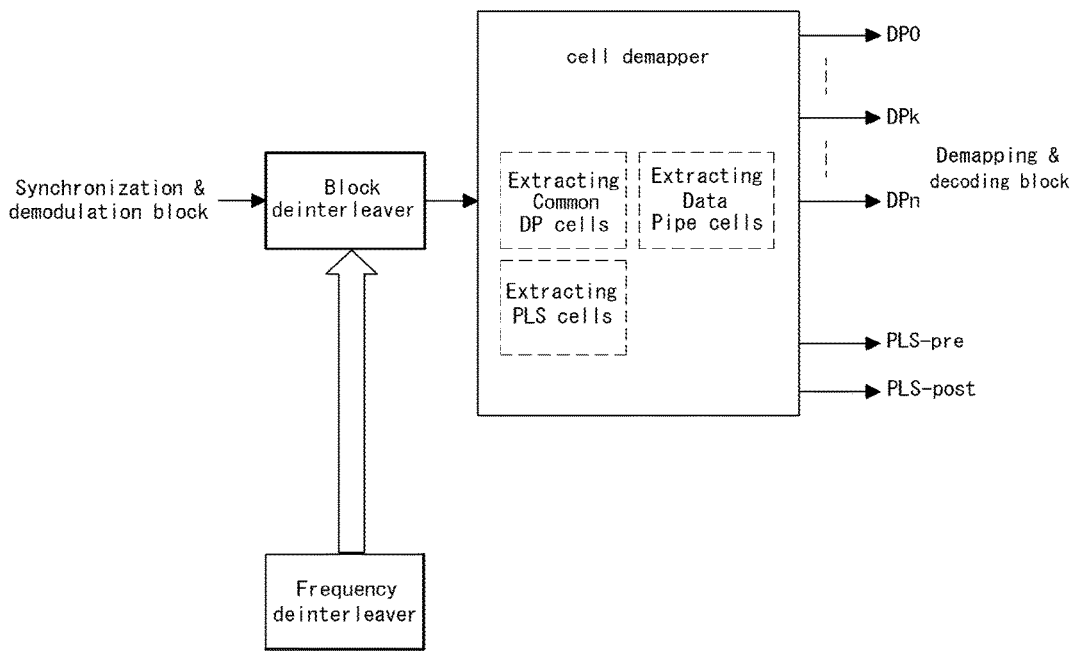

[Figure 43]
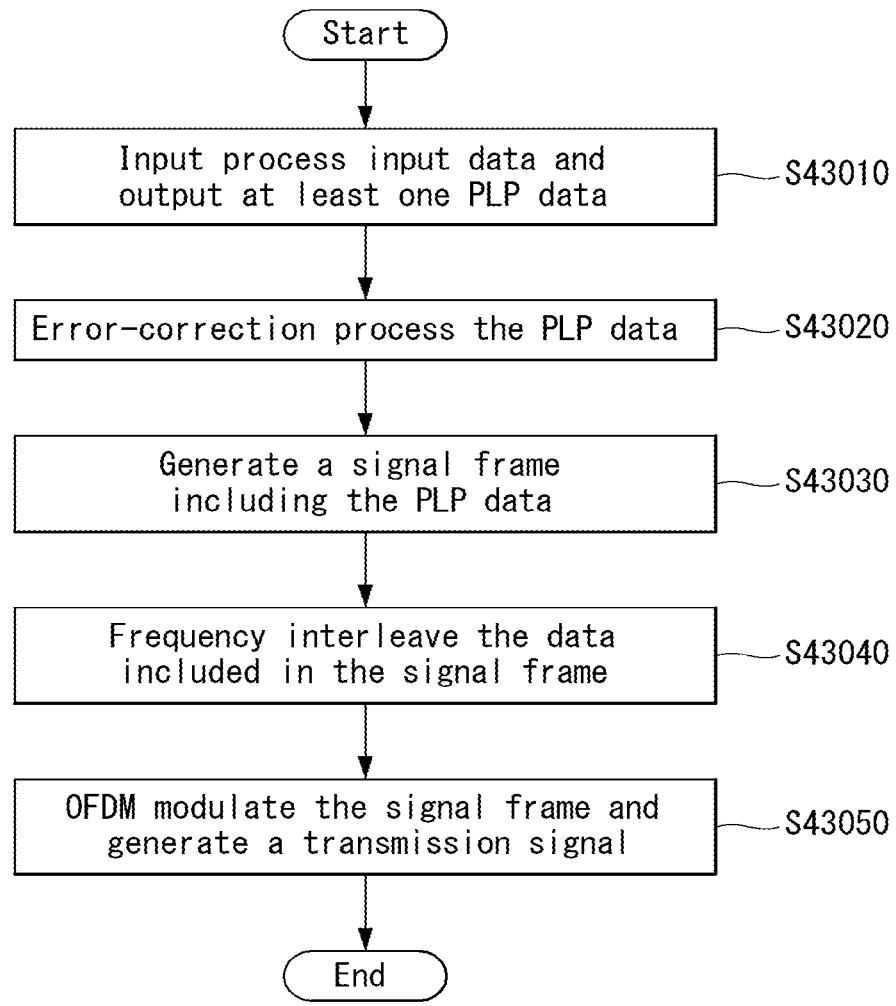

[Figure 44]
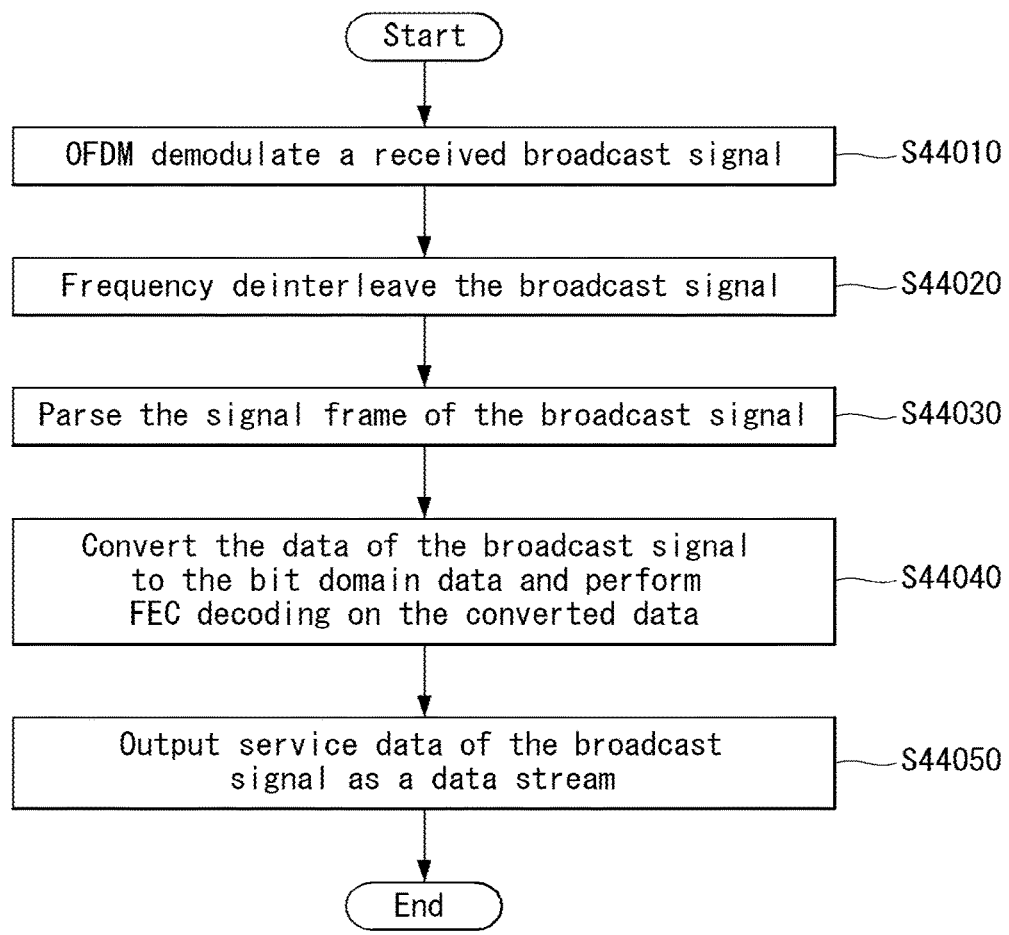

APPARATUS AND METHOD FOR SENDING AND RECEIVING BROADCAST SIGNALS

CROSS-REFERENCE TO RELATED APPLICATIONS

This application is a continuation of U.S. patent application Ser. No. 15/085,739, filed on Mar. 30, 2016, and claims priority to Provisional Application No. 62/193,594 filed on 17 Jul., 2015 in US, the entire contents of which is hereby incorporated by reference in its entirety.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

To solve the technical problem above, a broadcast signal receiver according to an embodiment of the present invention comprises a synchronization & demodulation module configured to OFDN demodulate a received broadcast signal; a frequency deinterleaver configured to frequency-deinterleave the broadcast signal; a frame parsing module configured to parse a signal frame of the broadcast signal; a demapping & decoding module configured to convert PLP data of the broadcast signal to the bit domain and to perform FEC decoding on the converted PLP data; and an output processing module configured to output a data stream by receiving the PLP data, wherein the signal frame comprises a bootstrap, a preamble and at least one subframe, and wherein the frequency deinterleaver frequency-deinterleaves the preamble and optionally frequency-deinterleaves the at least one subframe.

In a broadcast signal receiver according to an embodiment of the present invention, the frequency deinterleaver further comprises a symbol offset generator, and when the least one subframe is frequency-deinterleaved, the symbol offset generator is reset on a first symbol of each subframe.

In a broadcast signal receiver according to an embodiment of the present invention, the symbol offset generator is reset on a first symbol of the preamble.

In a broadcast signal receiver according to an embodiment of the present invention, the symbol offset generator generates a new offset for every symbol pair, and the symbol pair comprises two consecutive symbols.

In a broadcast signal receiver according to an embodiment of the present invention, the preamble comprises frequency interleaver information indicating whether the frequency interleaver is enabled or bypassed for the subframe, and the frequency deinterleaver optionally deinterleaves the subframe on the basis of the frequency interleaver information.

In a broadcast signal receiver according to an embodiment of the present invention, the frequency deinterleaver further comprises an offset addition block and an address check block, and the address check block validates an output address of the offset addition block.

To solve the technical problem above, a method for receiving a broadcast signal according to an embodiment of the present invention comprises OFDM demodulating a received broadcast signal; frequency interleaving the broadcast signal; parsing a signal frame of the broadcast signal; converting PLP data of the broadcast signal to the bit domain and performing FEC decoding on the converted PLP data; and outputting a data stream by receiving the PLP data, wherein the signal frame comprises a bootstrap, a preamble and at least one subframe; the frequency interleaving is performed on the preamble; and the at least one subframe is performed optionally.

In a method for receiving broadcast signal according to an embodiment of the present invention, the frequency deinterleaving further comprises generating a symbol offset, and when the at least one subframe is frequency-deinterleaved, the symbol offset generating can be reset on a first symbol of each subframe.

In a method for receiving a broadcast signal according to an embodiment of the present invention, the frequency deinterleaving can be reset on a first symbol of the preamble.

In a method for receiving a broadcast signal according to an embodiment of the present invention, the symbol offset generating generates a new offset for every symbol pair, and the symbol pair comprises two consecutive symbols.

In a method for receiving a broadcast signal according to an embodiment of the present invention, the preamble further comprises frequency interleaver information indicating whether the frequency interleaving is enabled or bypassed for the subframe, and the at least one subframe is optionally deinterleaved on the basis of the frequency interleaver information.

In a method for receiving a broadcast signal according to an embodiment of the present invention, the frequency deinterleaving further comprises offset adding and address checking; and the address checking validates an output address of the offset adding.

The present invention can process data according to service characteristics to control QoS (Quality of Services) for each service or service component, thereby providing various broadcast services.

The present invention can achieve transmission flexibility by transmitting various broadcast services through the same RE signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

Further aspects and effects of the present invention will be described more detail with embodiments in below.

BRIEF DESCRIPTION OF THE DRAWINGS

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 29 illustrates XFECBLOCK interleaved from each interleaving array according to an exemplary embodiment of the present invention.

FIG. 32 illustrates an FI address generator with respect to 32K FFT mode according to an embodiment of the present invention.

FIG. 33 illustrates an FI address generator with respect to 16K FFT mode according to an embodiment of the present invention.

FIG. 34 illustrates an FI address generator with respect to 8K FFT mode according to an embodiment of the present invention.

FIG. 35 illustrates a frame structure of a broadcast signal according to an embodiment of the present invention.

FIG. 36 illustrates a frequency interleaving operation on a frame structure of a broadcast signal according to an embodiment of the present invention.

FIG. 37 illustrates a method for frequency interleaving a broadcast signal according to one embodiment of the present invention.

FIG. 38 illustrates a method for frequency interleaving a broadcast signal according to one embodiment of the present invention.

FIG. 39 illustrates a frame parsing block according to one embodiment of the present invention.

FIG. 43 is a flow diagram illustrating a method for transmitting a broadcast signal of a broadcast signal transmitter according to an embodiment of the present invention.

FIG. 44 illustrates a method for receiving a broadcast signal of a broadcast signal receiver according to one embodiment of the present invention.

DETAILED DESCRIPTION OF THE EMBODIMENTS

Figure 1:
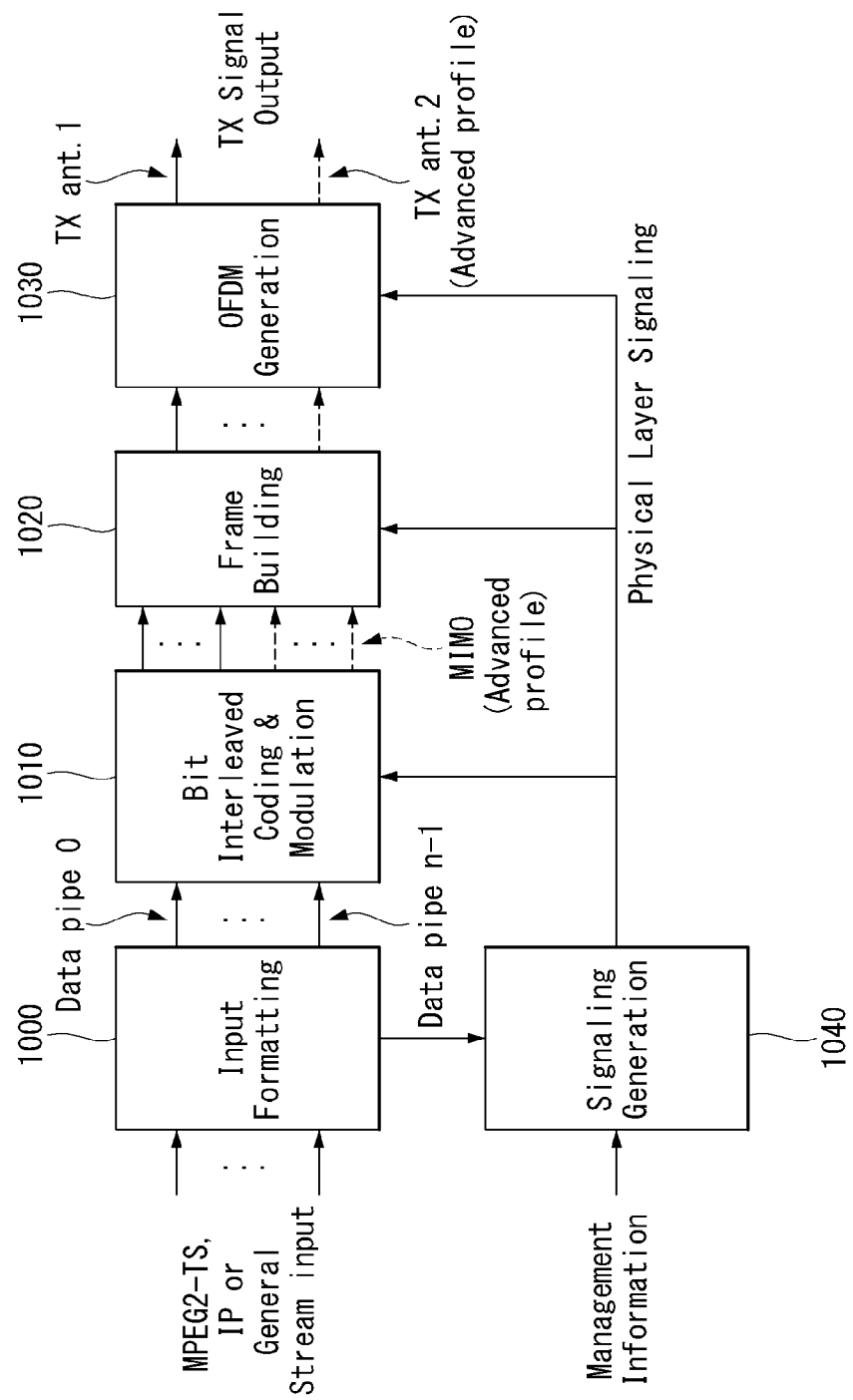
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16 Kbits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64 Kbits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot (sp) pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
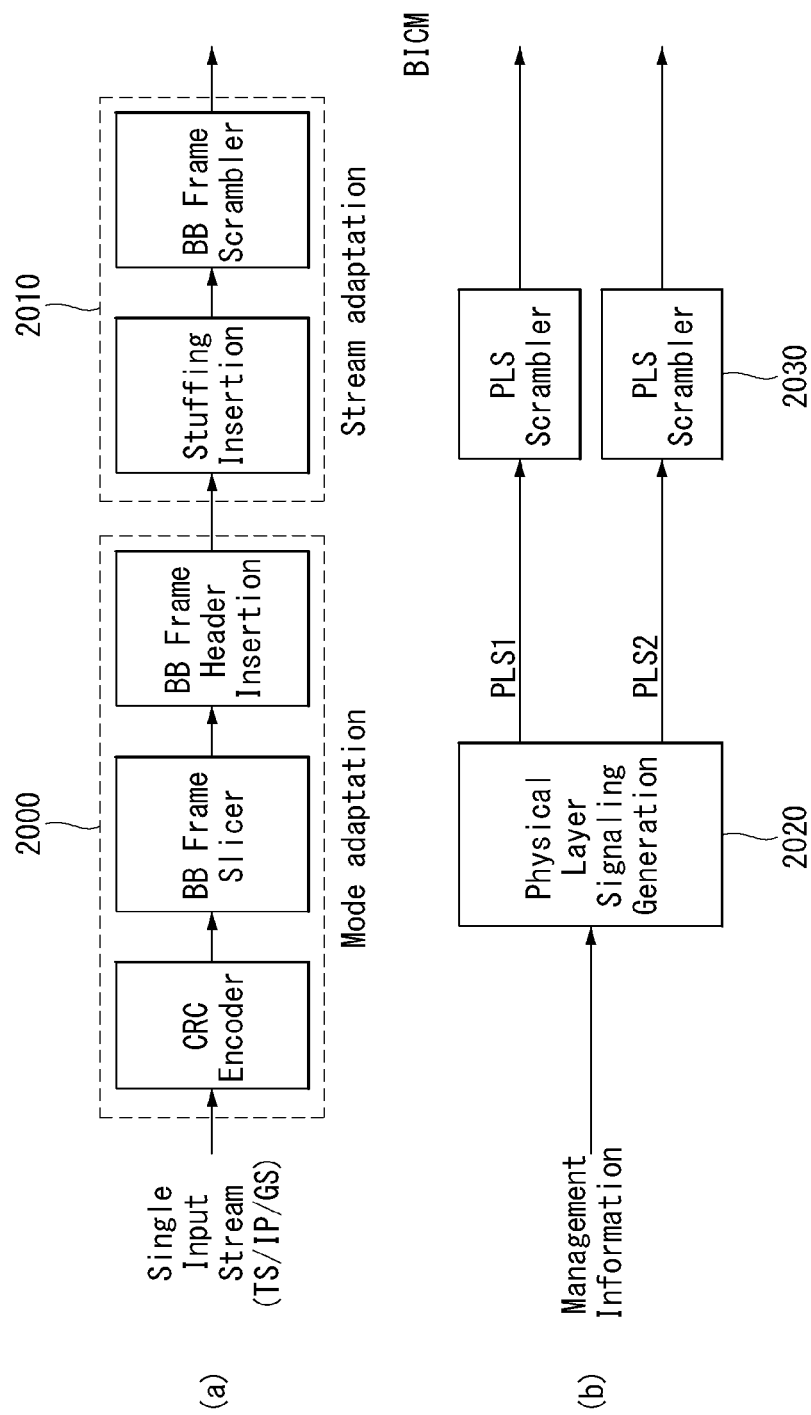
FIG. 2 illustrates an input formatting block according to one embodiment of the present invention.
Figure 3:
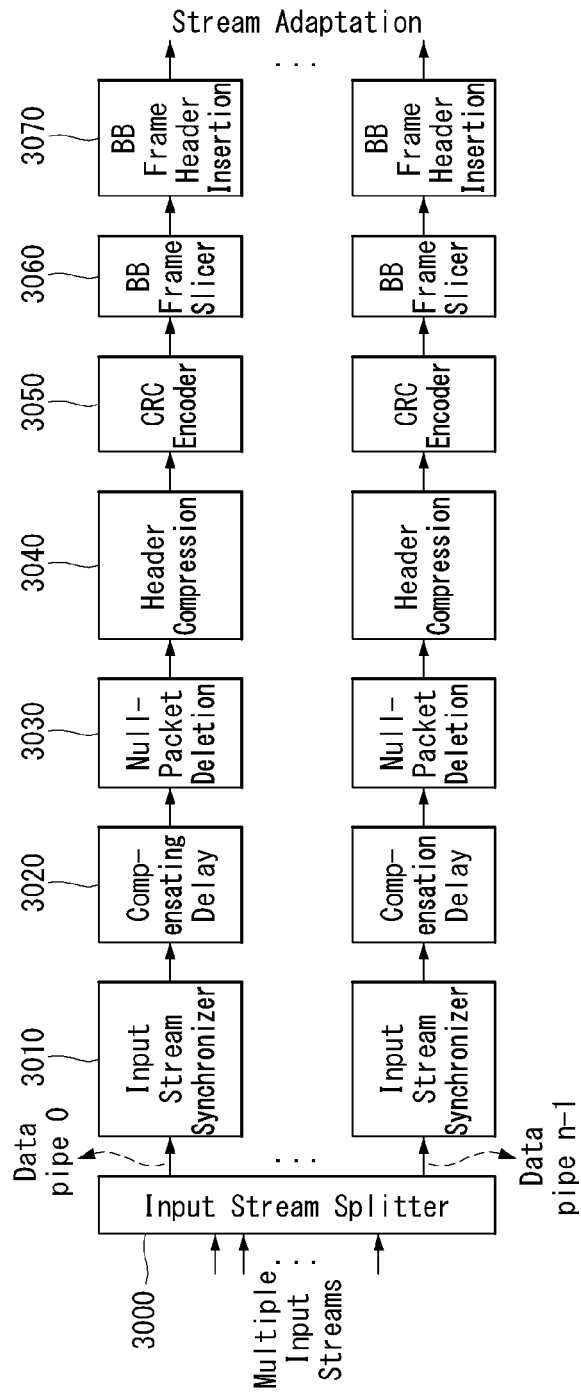
FIG. 3 illustrates an input formatting block according to another embodiment of the present invention.
Figure 4:
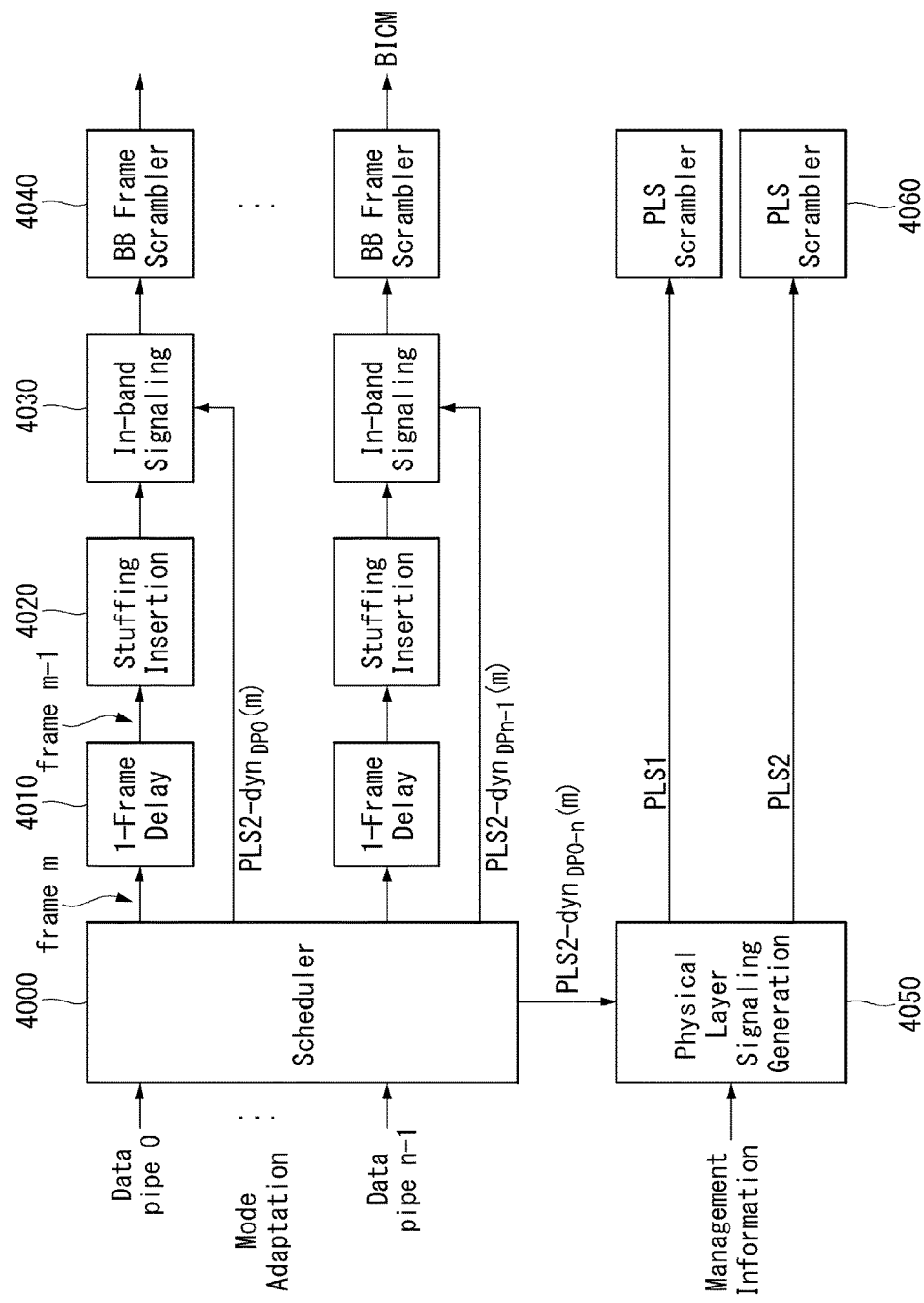
FIG. 4 illustrates an input formatting block according to another embodiment of the present invention.

FIGS. 2, 3 and 4 illustrate the input formatting block 1000 according to embodiments of the present invention. A description will be given of each FIGURE.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0×47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
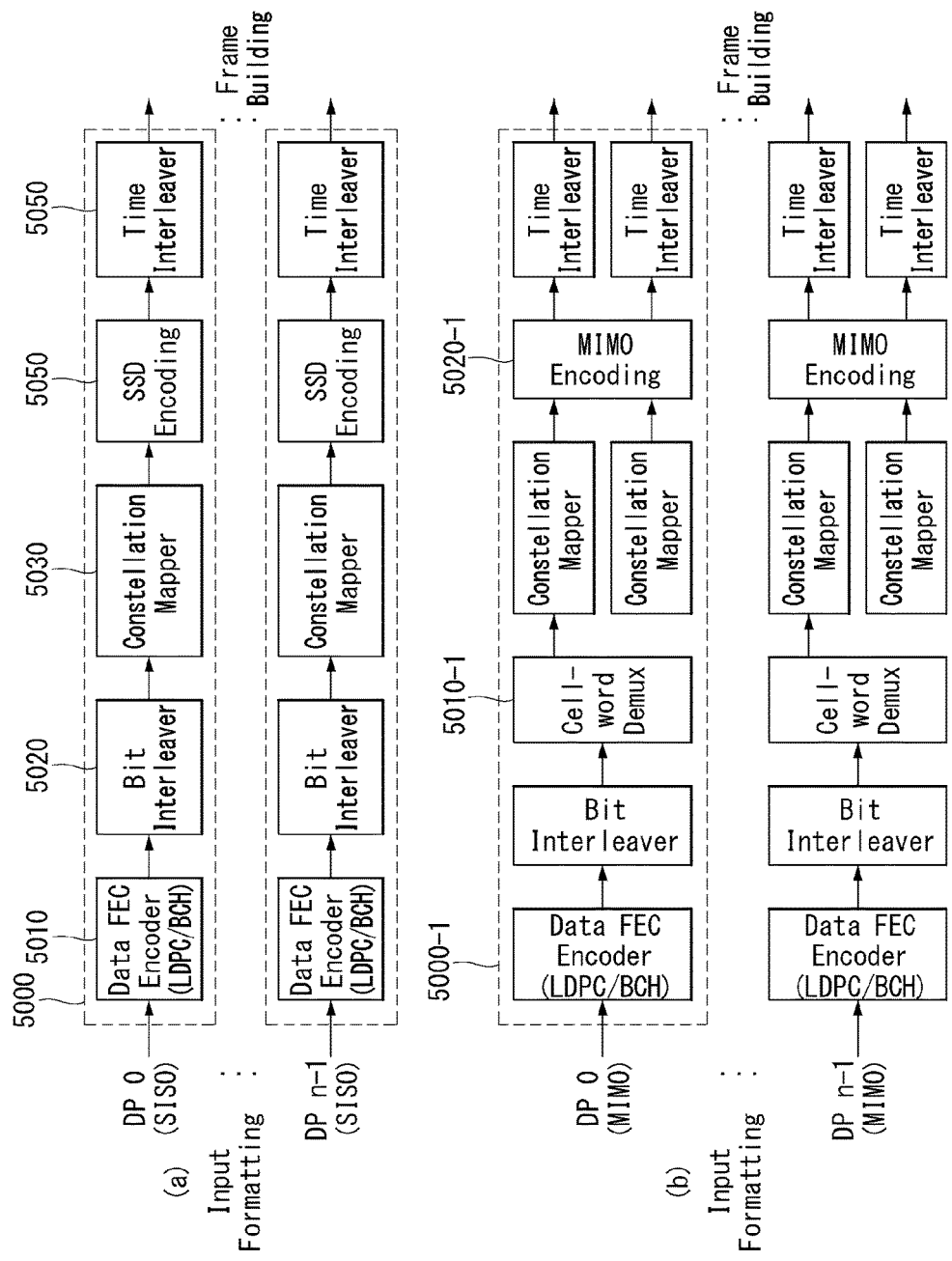
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPS input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
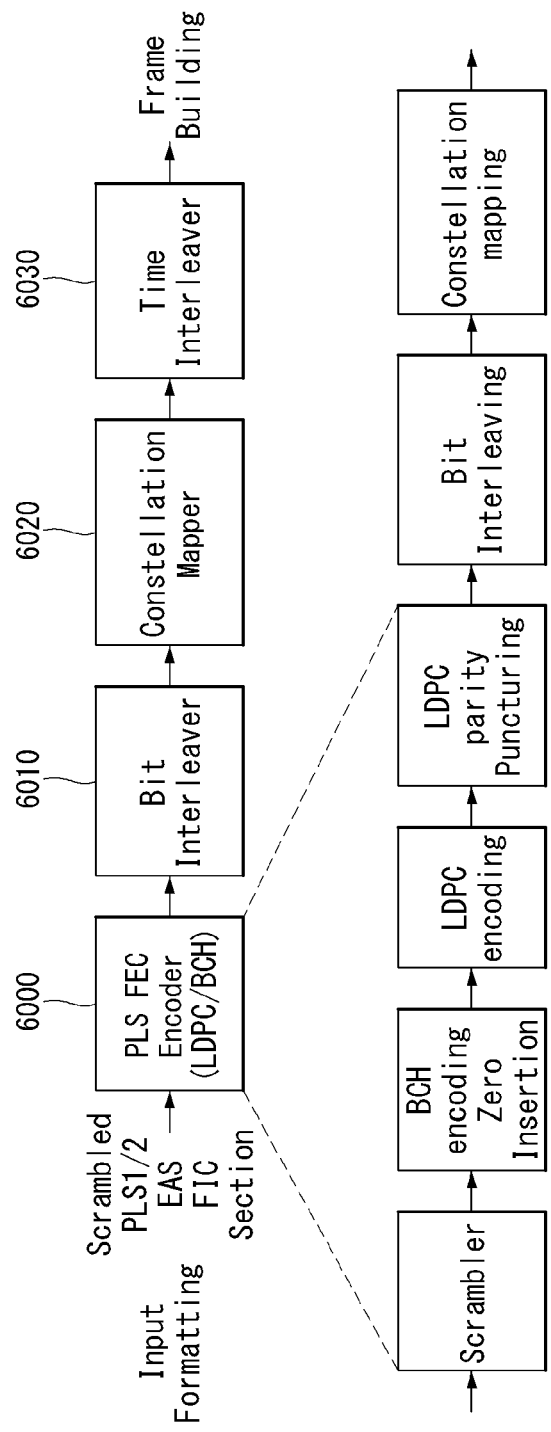
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 <1021 | 1020 | 60 | 1080 | 4320 | 3240 | 1/4 | 36 |
| PLS2 | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
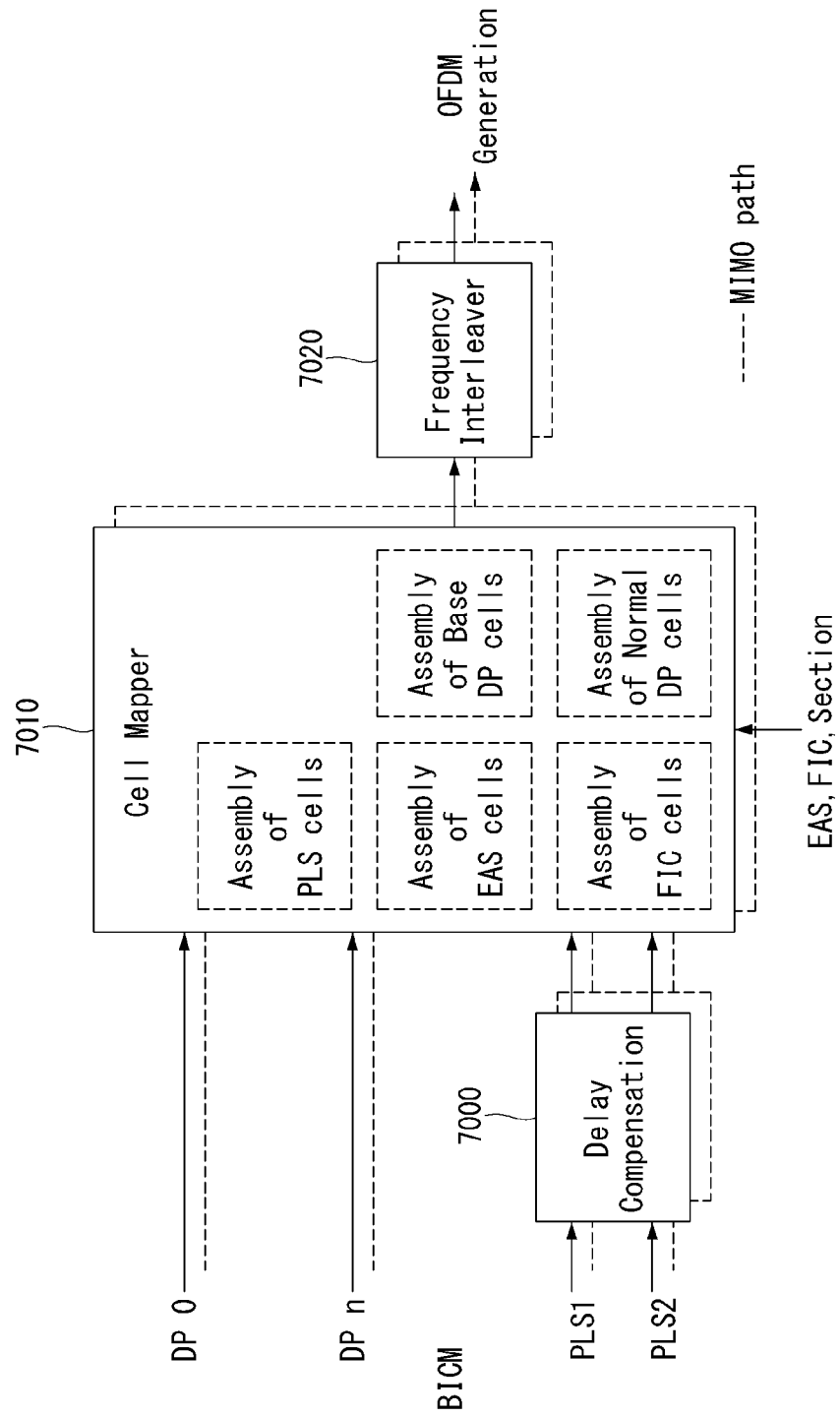
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
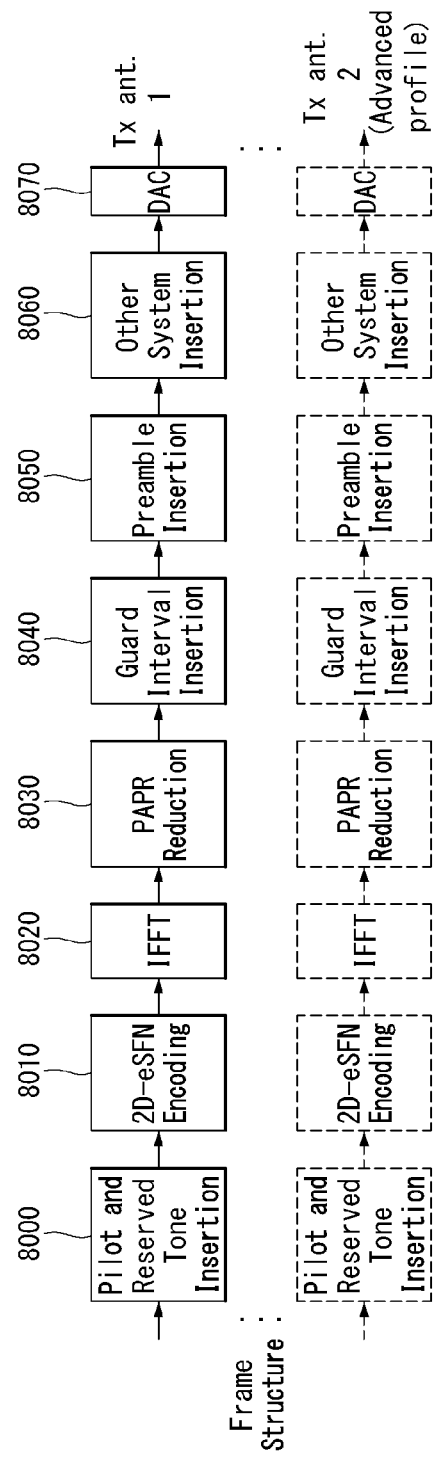
FIG. 8 illustrates an OFDM generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAD block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots (SP), continual pilots (CP), edge pilots (EP), FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
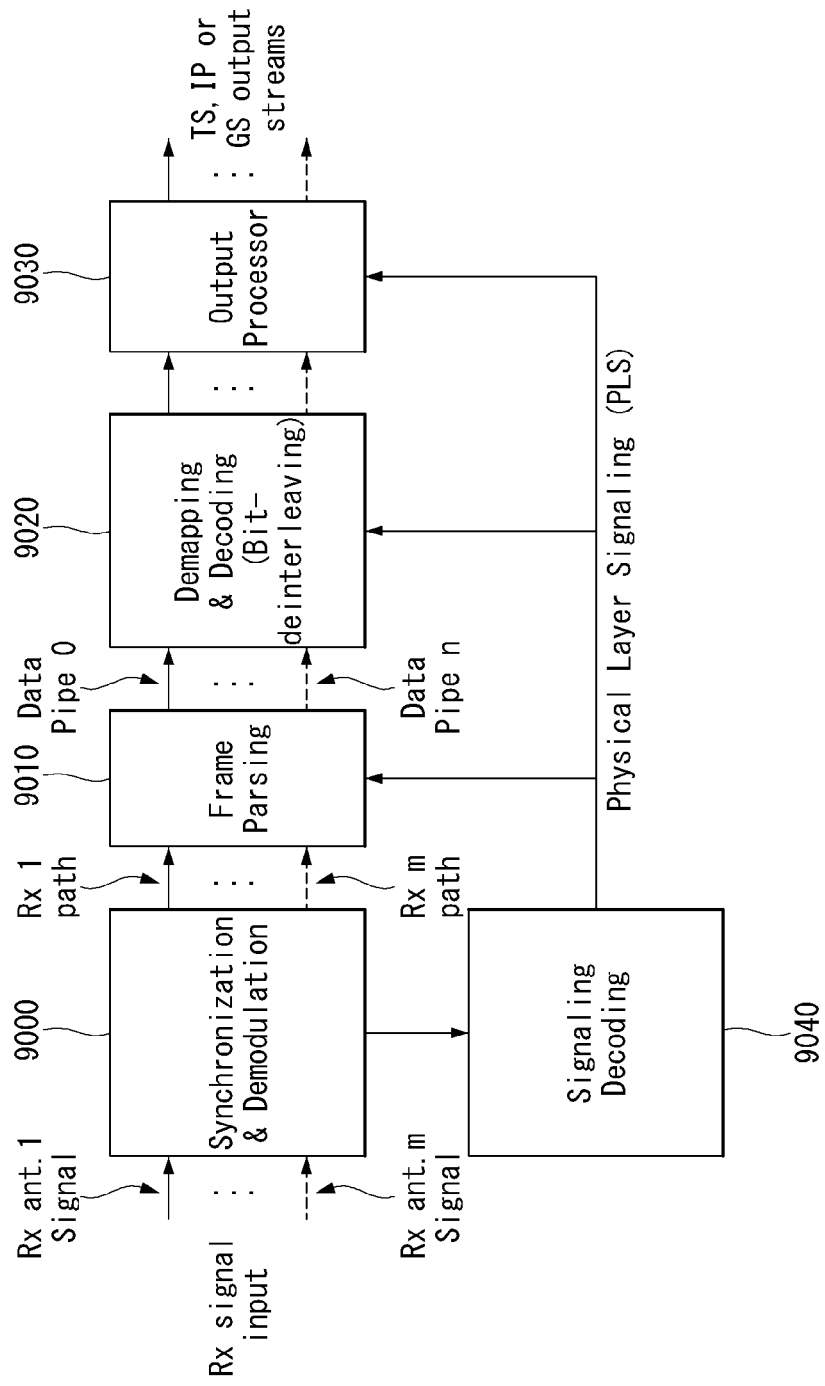
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9020 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 9030 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 10:
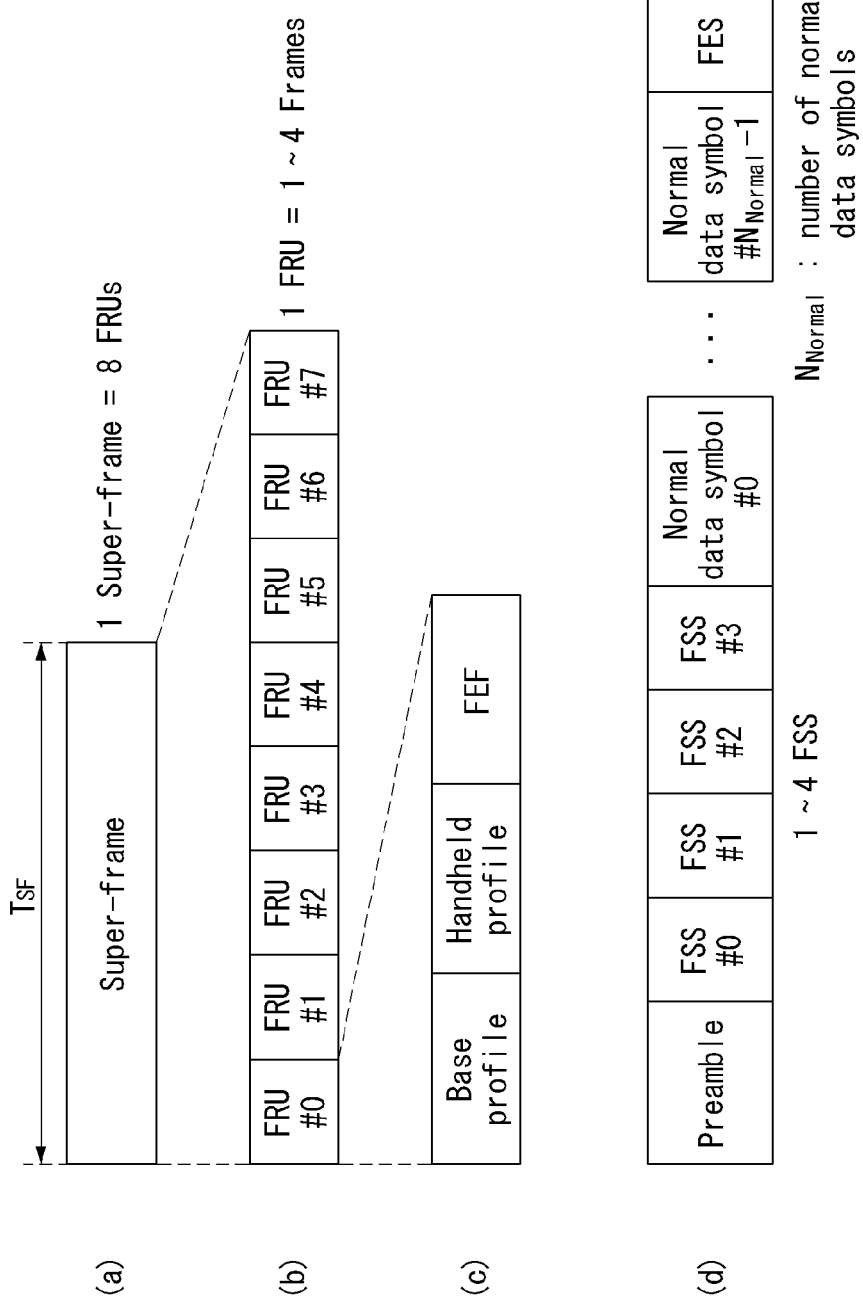
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Future-cast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If this field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2 SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (Pi=1). The allowed PI values with 2-bit field are defined in the below table 18.

TABLE 18

| 2-bit field | PI | NTI |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |

TABLE 19-continued

| Value | Payload Type |
|---|---|
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) N_FSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM

Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Equation 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1−1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2−1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch − Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$  [Equation 3]

The parameters for long FECBLOCK and short FECBLOCK are given in the above table 28 and 29, respectively.

The detailed procedure to calculate Nldpc-Kldpc parity bits for long FECBLOCK, is as follows:

1) Initialize the parity bits, $$p_0=p_1=p_2=\cdots=p_{N_{ldpc}-K_{ldpc}-1}=0$$ [Equation 4]

2) Accumulate the first information bit –i0, at parity bit addresses specified in the first row of an addresses of parity check matrix. The details of addresses of parity check matrix will be described later. For example, for rate 13/15:

$$p_{983}=p_{983}\oplus i_0 \quad p_{2815}=p_{2815}\oplus i_0$$

$$p_{4837}=p_{4837}\oplus i_0 \quad p_{4989}=p_{4989}\oplus i_0$$

$$p_{6138}=p_{6138}\oplus i_0 \quad p_{6458}=p_{6458}\oplus i_0$$

$$p_{6921}=p_{6921}\oplus i_0 \quad p_{6974}=p_{6974}\oplus i_0$$

$$p_{7572}=p_{7572}\oplus i_0 \quad p_{8260}=p_{8260}\oplus i_0$$

$$p_{8496}=p_{8496}\oplus i_0$$ [Equation 5]

3) For the next 359 information bits, is, s=1, 2, . . . , 359 accumulate is at parity bit addresses using following Equation.

$$\{x+(s \bmod 360)\times Q_{ldpc}\} \bmod(N_{ldpc}-K_{ldpc})$$ [Equation 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007}=p_{1007}\oplus i_0 \quad p_{2839}=p_{2839}\oplus i_0$$

$$p_{4861}=p_{4861}\oplus i_0 \quad p_{5013}=p_{5013}\oplus i_0$$

$$p_{6162}=p_{6162}\oplus i_0 \quad p_{6482}=p_{6482}\oplus i_0$$

$$p_{6945}=p_{6945}\oplus i_0 \quad p_{6998}=p_{6998}\oplus i_0$$

$$p_{7596}=p_{7596}\oplus i_0 \quad p_{8284}=p_{8284}\oplus i_0$$

$$p_{8520}=p_{8520}\oplus i_0$$ [Equation 7]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i\oplus p_{i-1}, \quad i=1,2,\ldots,N_{ldpc}-K_{ldpc}-1$$ [Equation 8]

where final content of pi, i=0, 1, . . . Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
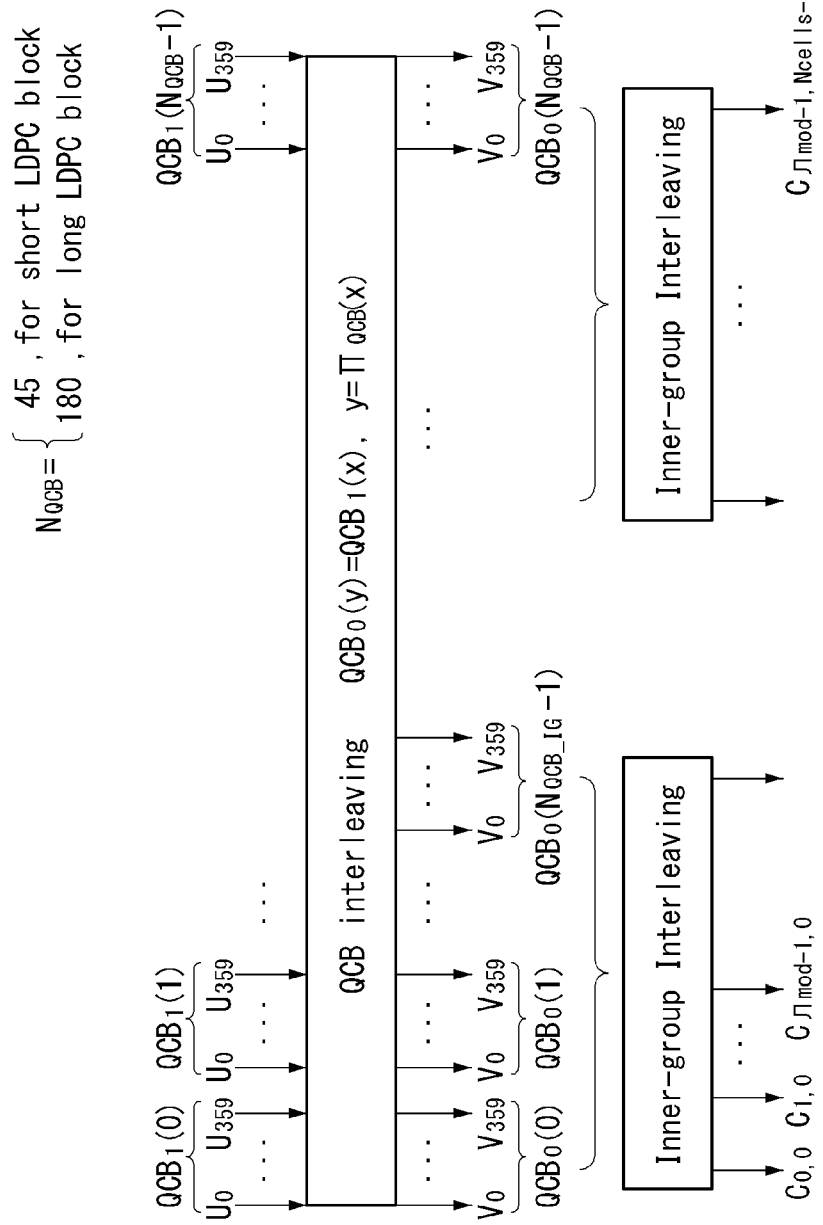
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/ηmod or 16200/ηmod according to the FECBLOCK length. The QCB interleaving pattern is unique to each combination of modulation type and LDPC code rate.

After QCB interleaving, inner-group interleaving is performed according to modulation type and order (ηmod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
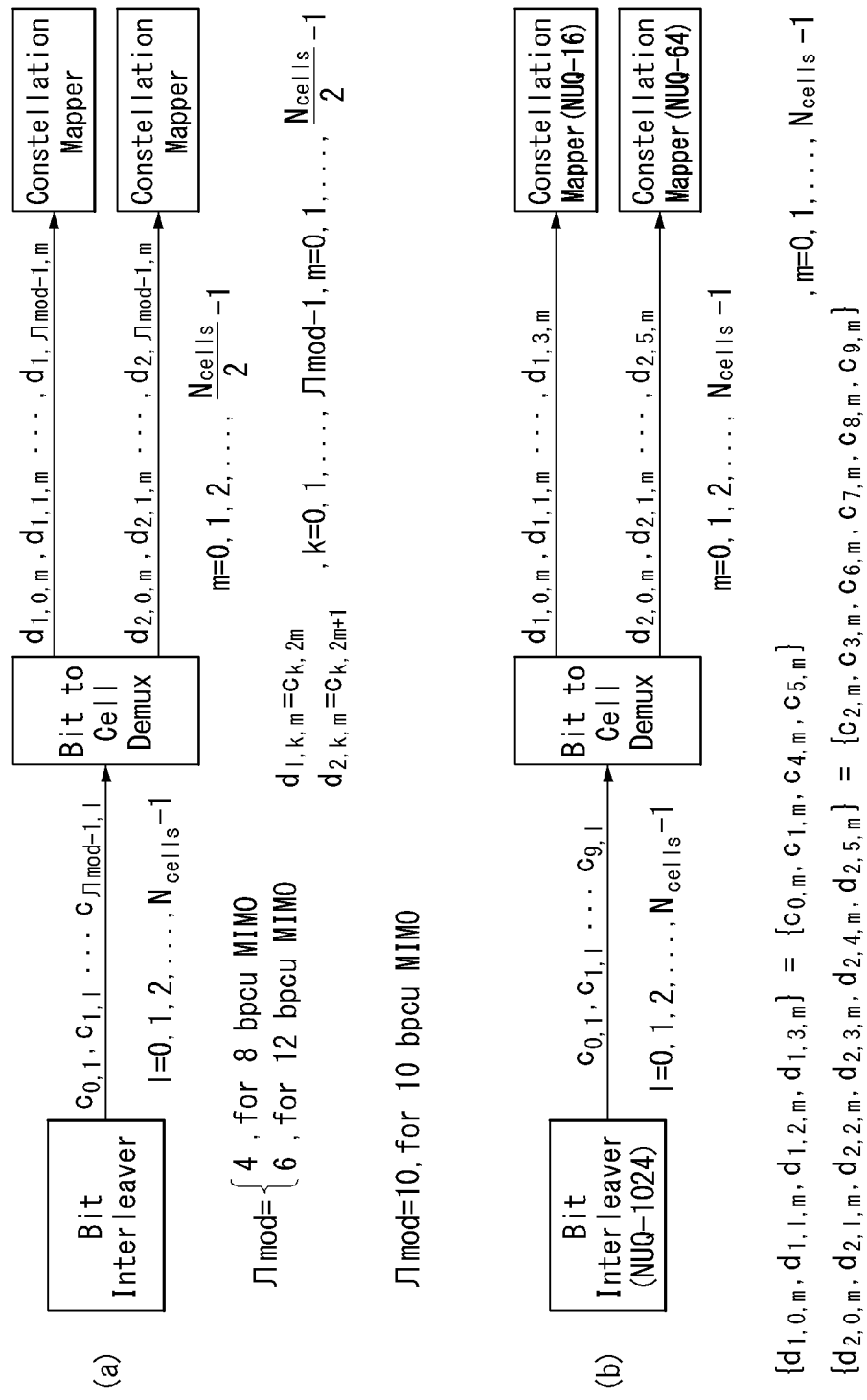
FIG. 24 illustrates a cell-word demultiplexing according to an embodiment of the present invention.

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,1, c1,1, . . . , cηmod−1,1) of the bit interleaving output is demultiplexed into (d1,0,m, d1,1,m . . . , d1,ηmod−1,m) and (d2,0,m, d2,1,m . . . , d2,ηmod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1,m . . . , d1,3,m) and (d2,0,m, d2,1,m . . . , d2,5,m), as shown in (b).

Figure 25:
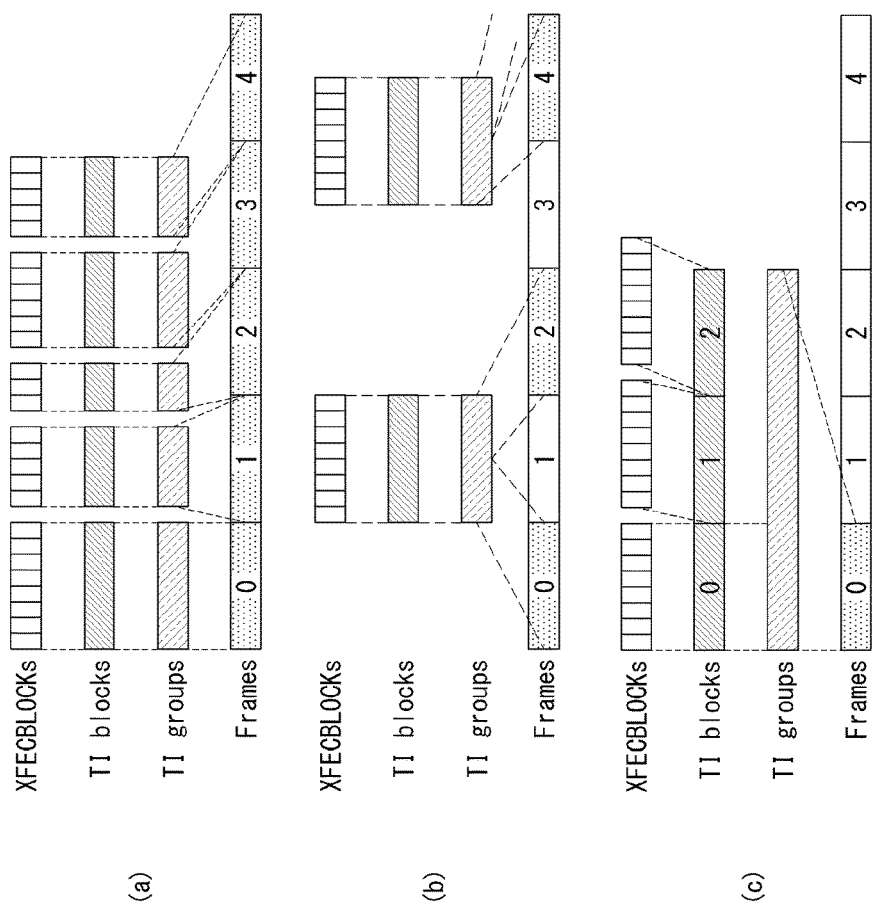
FIG. 25 illustrates a time interleaving according to an embodiment of the present invention.

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1},$$
$$\ldots, d_{n,s,N_{xBLOCK\_TI}(n,s)-1,0}, \ldots d_{n,s,N_{xBLOCK\_TI}(n,s)-1,N_{cells}-1}),$$

where $d_{n,s,r,q}$ the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1})$$

where $h_{n,s,i}$ is the ith output cell (for $i=0, \ldots, N_{xBLOCK\_TI}(n,s) \times N_{cells}-1$), in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 26:
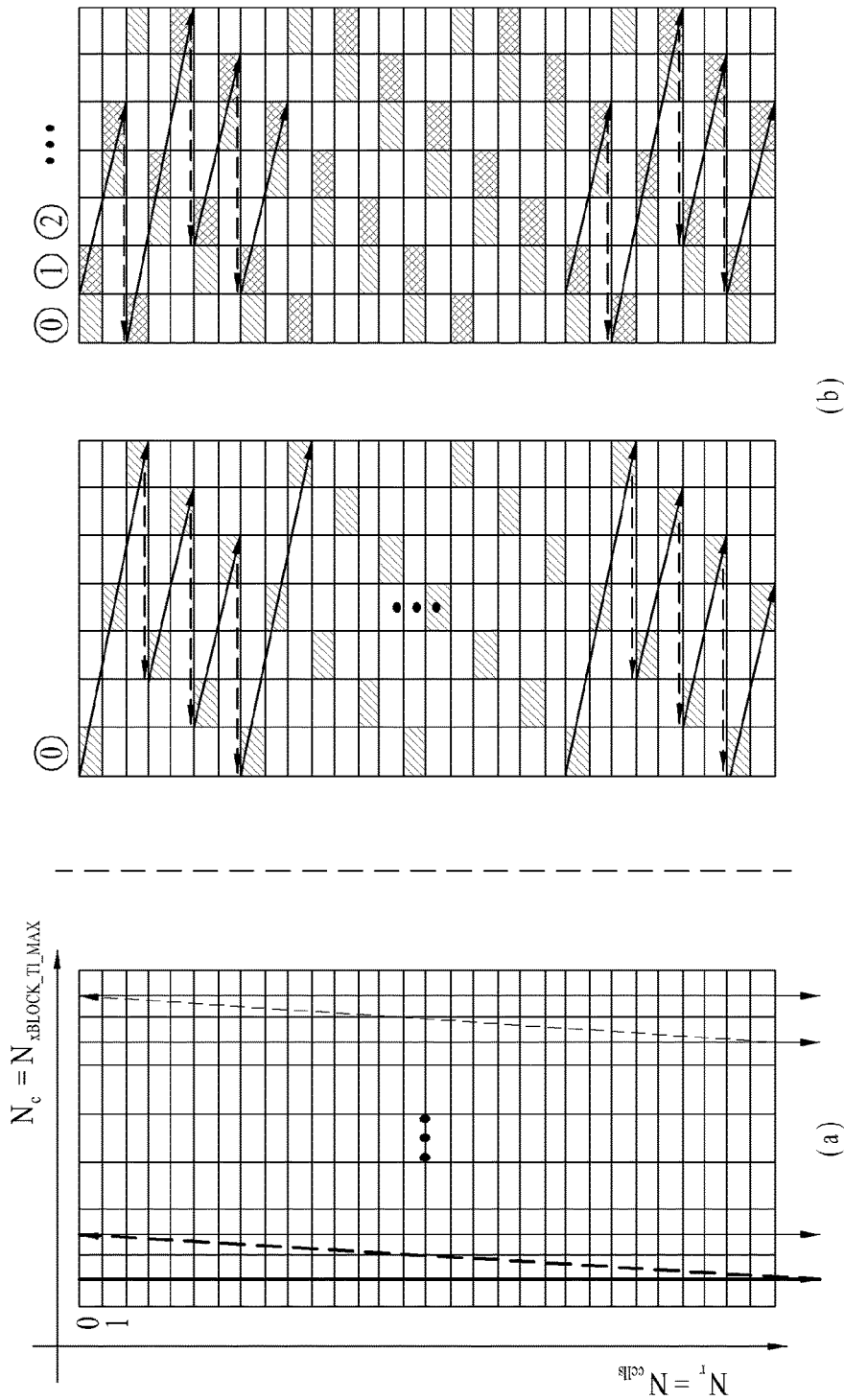
FIG. 26 illustrates a basic operation of a twisted row-column block interleaver according to an exemplary embodiment of the present invention.

FIG. 26 illustrates a basic operation of a twisted row-column block interleaver according to an exemplary embodiment of the present invention.

FIG. 26A illustrates a writing operation in a time interleaver and FIG. 26B illustrates a reading operation in the time interleaver. As illustrated in FIG. 26A, a first XFECBLOCK is written in a first column of a time interleaving memory in a column direction and a second XFECBLOCK is written in a next column, and such an operation is continued. In addition, in an interleaving array, a cell is read in a diagonal direction. As illustrated in FIG. 26B, while the diagonal reading is in progress from a first row (to a right side along the row starting from a leftmost column) to a last row, $N_r$ cells are read. In detail, when it is assumed that $z_{n,s,i}$ ($i=0, \ldots, N_r N_c$) is a time interleaving memory cell position to be sequentially read, the reading operation in the interleaving array is executed by calculating a row index $R_{n,s,i}$, a column index $C_{n,s,i}$, and associated twist parameter $T_{n,s,i}$ as shown in an equation given below.

$$\text{GENERATE}(R_{n,s,i}, C_{n,s,i}) = \quad \text{[Equation 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Where, $S_{shift}$ is a common shift value for a diagonal reading process regardless of $N_{xBLOCK\_TI}(n,s)$ and the shift value is decided by $N_{xBLOCK\_TI\_MAX}$ given in PLS2-STAT as shown in an equation given below.

[Equation 10]

$$\text{for}$$
$$\begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$
$$S_{shift} = \frac{N'_{xBLOCK\_TI\_MAX} - 1}{2}$$

Consequently, the cell position to be read is calculated by a coordinate $z_{n,s,i} = N_r C_{n,s,i} + R_{n,s,i}$.

Figure 27:
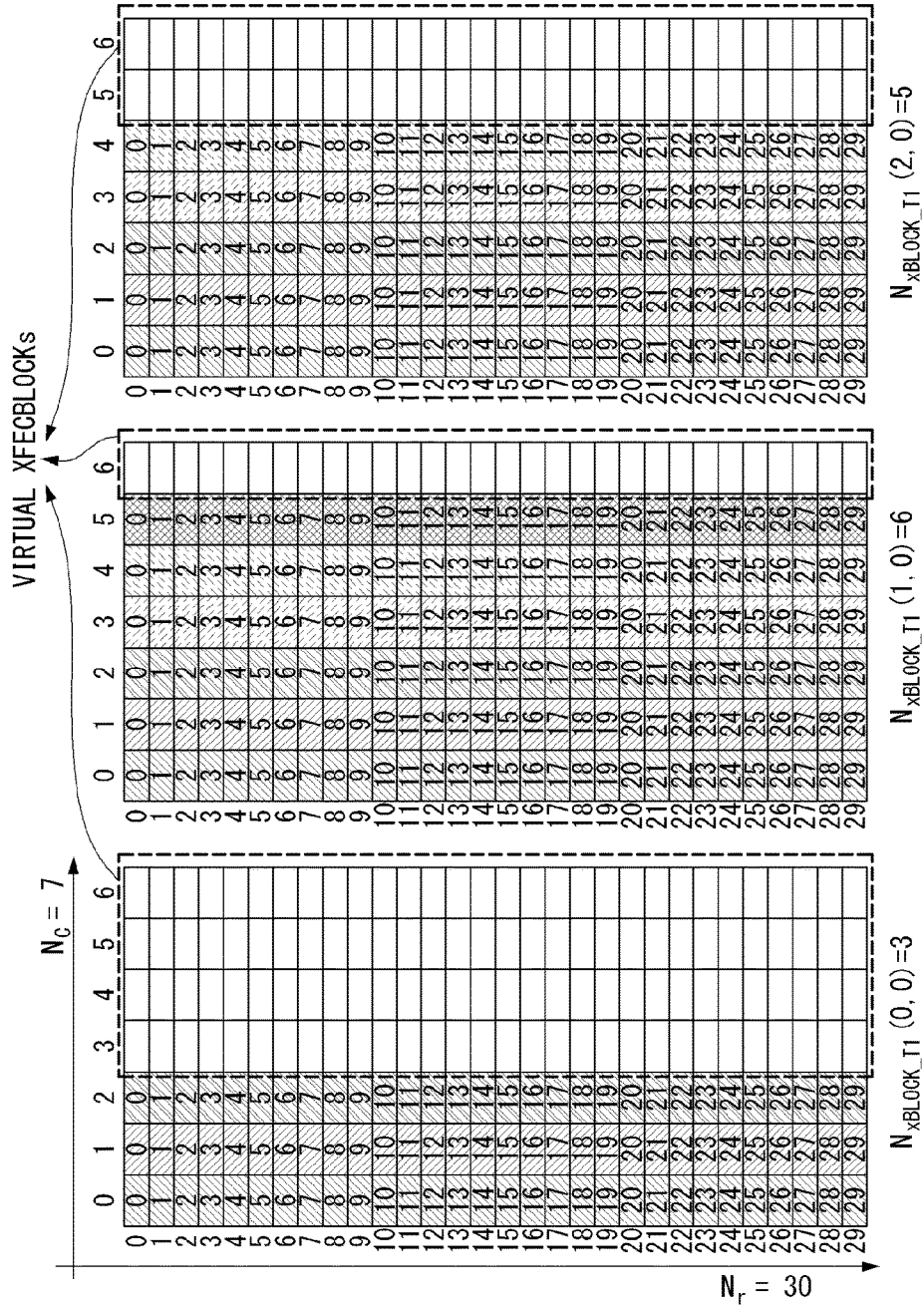
FIG. 27 illustrates an operation of a twisted row-column block interleaver according to another exemplary embodiment of the present invention.

FIG. 27 illustrates an operation of a twisted row-column block interleaver according to another exemplary embodiment of the present invention.

In more detail, FIG. 27 illustrates an interleaving array in the time interleaving memory for respective time interleaving groups including a virtual XFECBLOCK when $N_{xBLOCK\_TI}(0,0)=3$, $N_{xBLOCK\_TI}(1,0)=6$, and $N_{xBLOCK\_TI}(2,0)=5$.

A variable $N_{xBLOCK\_TI}(n,s)=N_r$ will be equal to or smaller than $N'_{xBLOCK\_TI\_MAX}$. Accordingly, in order for a receiver to achieve single memory interleaving regardless of $N_{xBLOCK\_TI}(n,s)$ the size of the interleaving array for the twisted row-column block interleaver is set to a size of $N_r \times N_c = N_{cells} \times N'_{xBLOCK\_TI\_MAX}$ by inserting the virtual XFECBLOCK into the time interleaving memory and a reading process is achieved as shown in an equation given below.

$$p = 0; \quad \text{[Equation 11]}$$
$$\text{for } i = 0; i < N_{cells} N'_{xBLOCK\_TI\_MAX}; i = i+1$$
$$\{\text{GENERATE}(R_{n,s,i}, C_{n,s,i});$$
$$V_i = N_r C_{n,s,j} + R_{n,s,j}$$
$$\text{if } V_i < N_{cells} N_{xBLOCK\_TI}(n,s)$$
$$\{$$
$$Z_{n,s,p} = V_i; p = p+1;$$
$$\}$$
$$\}$$

The number of the time interleaving groups is set to 3. An option of the time interleaver is signaled in the PLS2-STAT by DP_TI_TYPE='0', DP_FRAME_INTERVAL='1', and DP_TI_LENGTH='1', that is, NTI=1, IJUMP=1, and PI=1. The number of respective XFECBLOCKs per time interleaving group, of which Ncells=30 is signaled in PLS2-DYN data by NxBLOCK_TI(0,0)=3, NxBLOCK_TI(1,0)=6, and NxBLOCK_TI(2,0)=5 of the respective XFECBLOCKs. The maximum number of XFECBLOCKs is signaled in the PLS2-STAT data by NxBLOCK_Group_MAX and this is continued to $\lfloor N_{xBLOCK\_Group\_MAX} / N_{TI} \rfloor = N_{xBLOCK\_TI\_MAX} = 6$.

Figure 28:
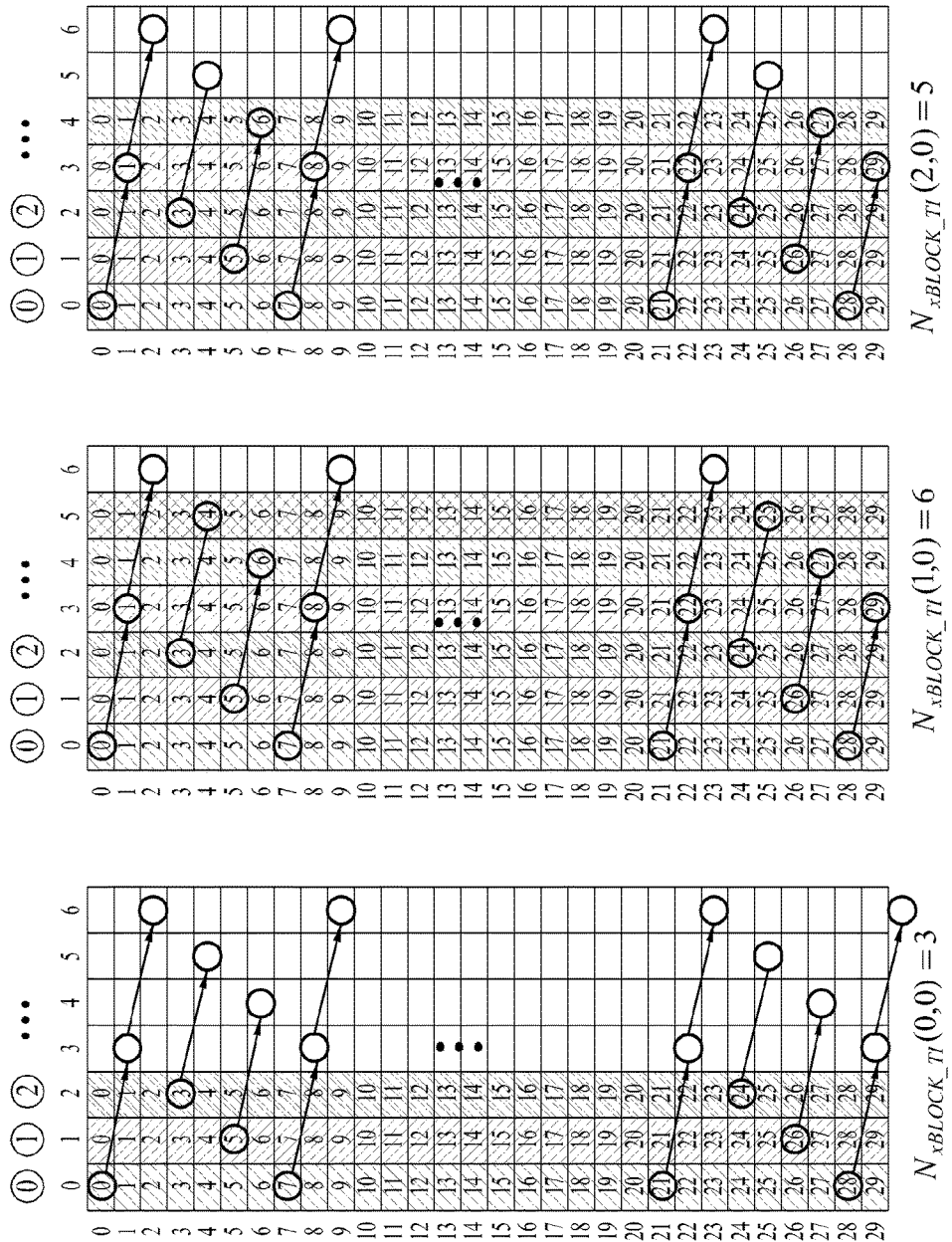
FIG. 28 illustrates a diagonal reading pattern of the twisted row-column block interleaver according to the exemplary embodiment of the present invention.

FIG. 28 illustrates a diagonal reading pattern of the twisted row-column block interleaver according to the exemplary embodiment of the present invention.

In more detail, FIG. 28 illustrates a diagonal reading pattern from respective interleaving arrays having parameters $N'_{xBLOCK\_TI\_MAX}=7$ and $S_{shift}=(7-1)/2=3$. In this case, during a reading process expressed by a pseudo code given above, when $V_i \geq N_{cell} N_{xBLOCK\_TI}(n,s)$, a value of Vi is omitted and a next calculation value of Vi is used.

Figure 29:
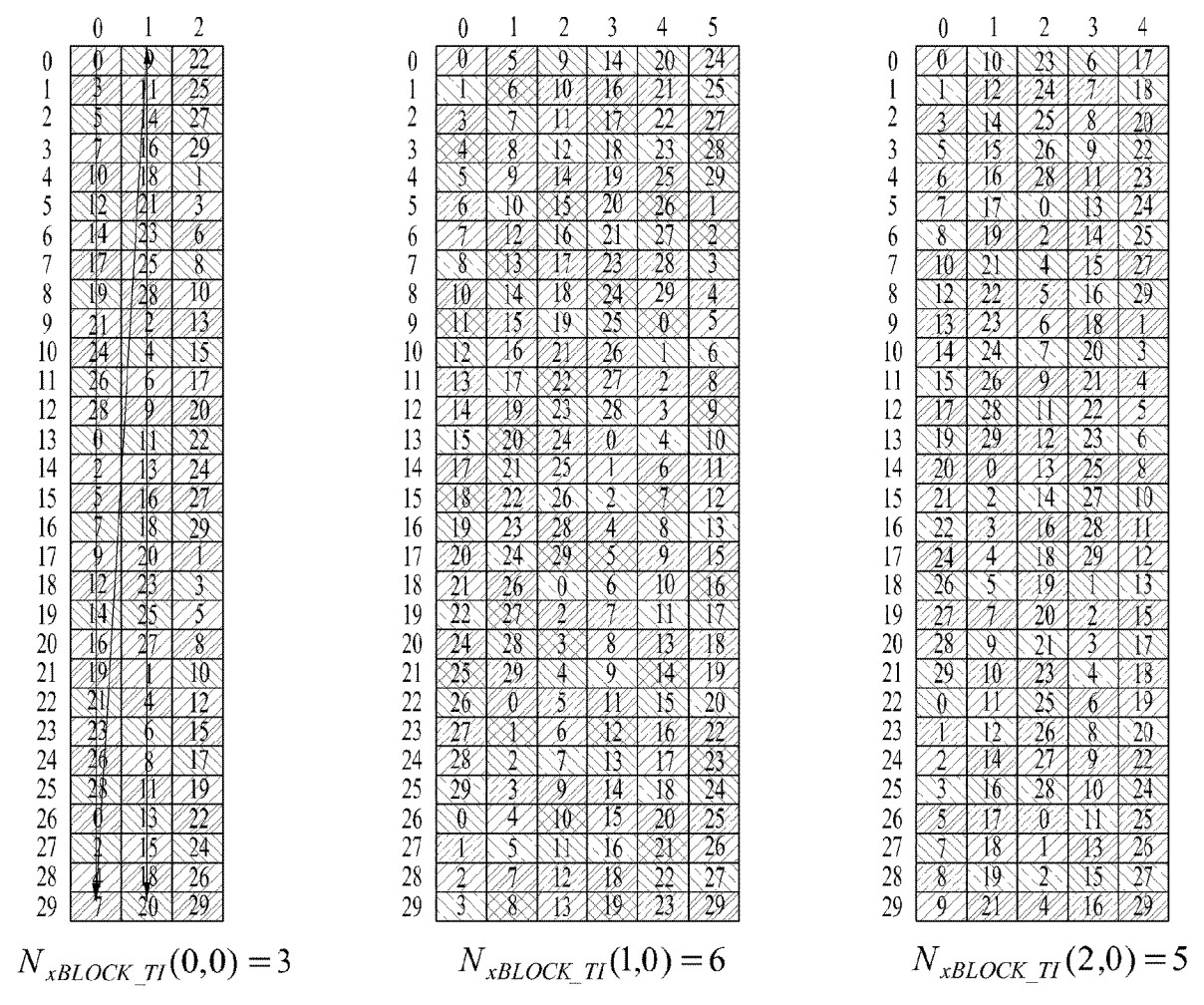

FIG. 29 illustrates XFECBLOCK interleaved from each interleaving array according to an exemplary embodiment of the present invention.

FIG. 29 illustrates XFECBLOCK interleaved from each interleaving array having parameters $N'_{xBLOCK\_TI\_MAX}=7$ and Sshift=3 according to an exemplary embodiment of the present invention.

In this document, the DP can be called a Physical Layer Pipe (PLP), and the PLS information can be called Layer 1 (L1) information or L1 signaling information. The PLS1 information can be called L1 basic information, and the PLS2 information can be called L1 detail information.

Figure 30:
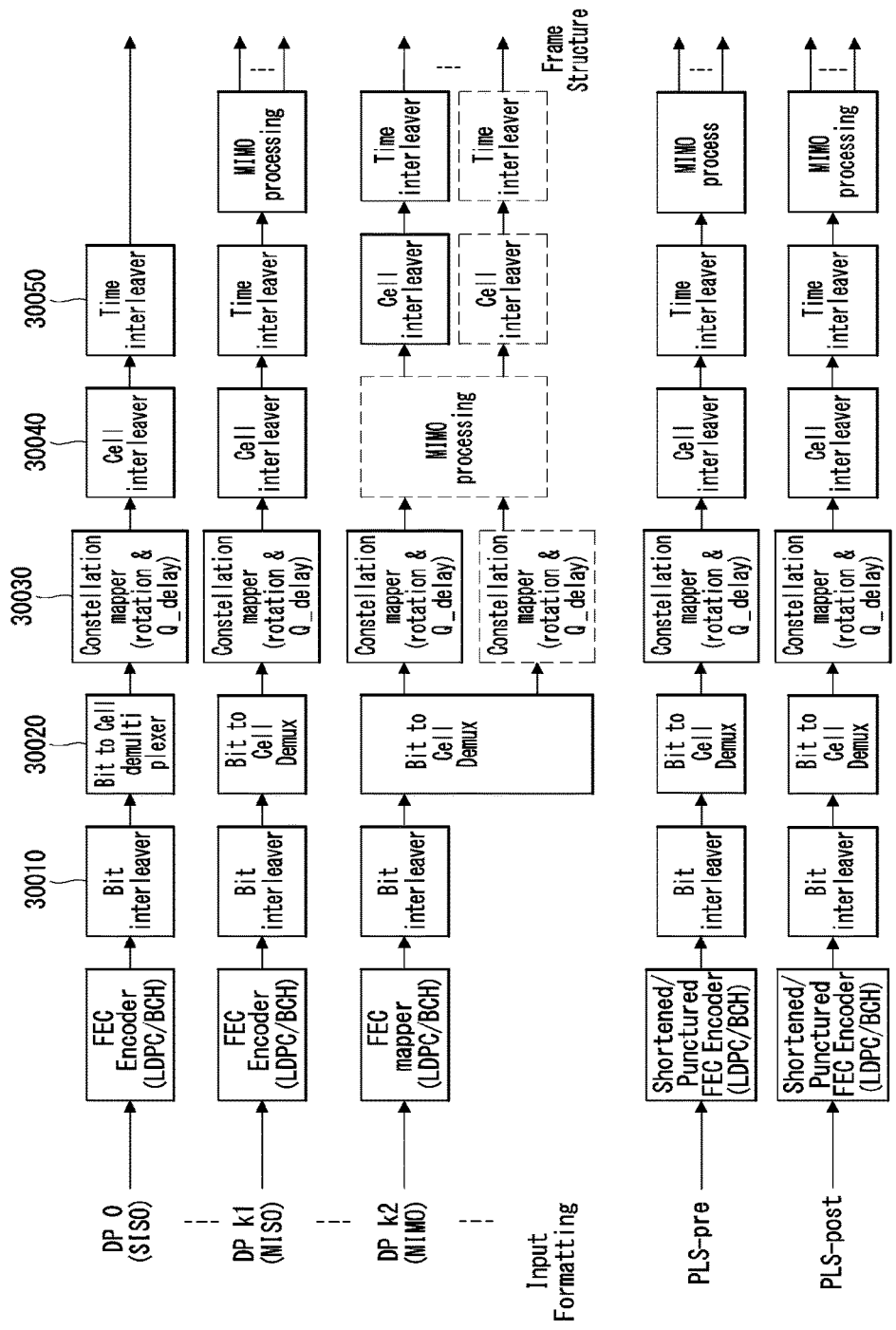
FIG. 30 illustrates a detailed block diagram of a BICM block according to another embodiment of the present invention.

FIG. 30 illustrates a detailed block diagram of a BICM block according to another embodiment of the present invention.

Descriptions of the specific blocks of FIG. 30 which are the same as given above will not be repeated.

As an embodiment, a broadcast transmitter can apply the SISO, MISO, or MIMO scheme independently for each PLP or DP, a unit capable of adjusting Quality of Service (QoS) in the physical layer. Therefore, the QoS can be adjusted for each service or service component transmitted through the corresponding PLP. In the case of a SISO PLP, the broadcast transmitter performs BCH encoding and LDCP encoding on the input bit stream to add redundancy, thereby making the error on a transmission channel corrected at the receiver.

The bit interleaver 30010 is capable of interleaving an input bit stream according to an interleaving rule to make the input bit stream robust to a burst error that can occur in a transmission channel. In case deep fading or erasure is applied to the QAM symbol, since interleaved bits are mapped to each QAM symbol, an error in consecutive bits among the entire codeword bits can be prevented from being occurred.

The bit-cell demultiplexer 30020 (bit to cell demultiplexer) can output the input bit stream after determining the order of the bit stream so that individual bits within the FEC block can be transmitted with appropriate robustness by taking into account the order of the input bit stream and a constellation mapping rule.

The constellation mapper 30030 can allocate/map an input bit word to one constellation. At this time, rotation and Q delay can be applied additionally. In other words, the constellation mapper 30030 rotates an input constellation according to rotation angles, divides them into in-phase components and quadrature-phase components, and delays only the quadrature components by an arbitrary amount. The constellation mapper 30030 can perform remapping newly paired in-phase and quadrature-phase components to form a new constellation.

The cell interleaver 30040 mixes the cells belonging to one FEC block in a random fashion so that the cells corresponding to each FEC block can be output in a different order.

The time interleaver 30050 can output cells belonging to multiple FEC blocks after mixing the cells. Therefore, since cells of each FEC block is transmitted being distributed within an interval as long as the time interleaving depth, additional diversity gain can be achieved. The time interleaver 30050 can be included in the framing/interleaving block as described above.

Figure 31:
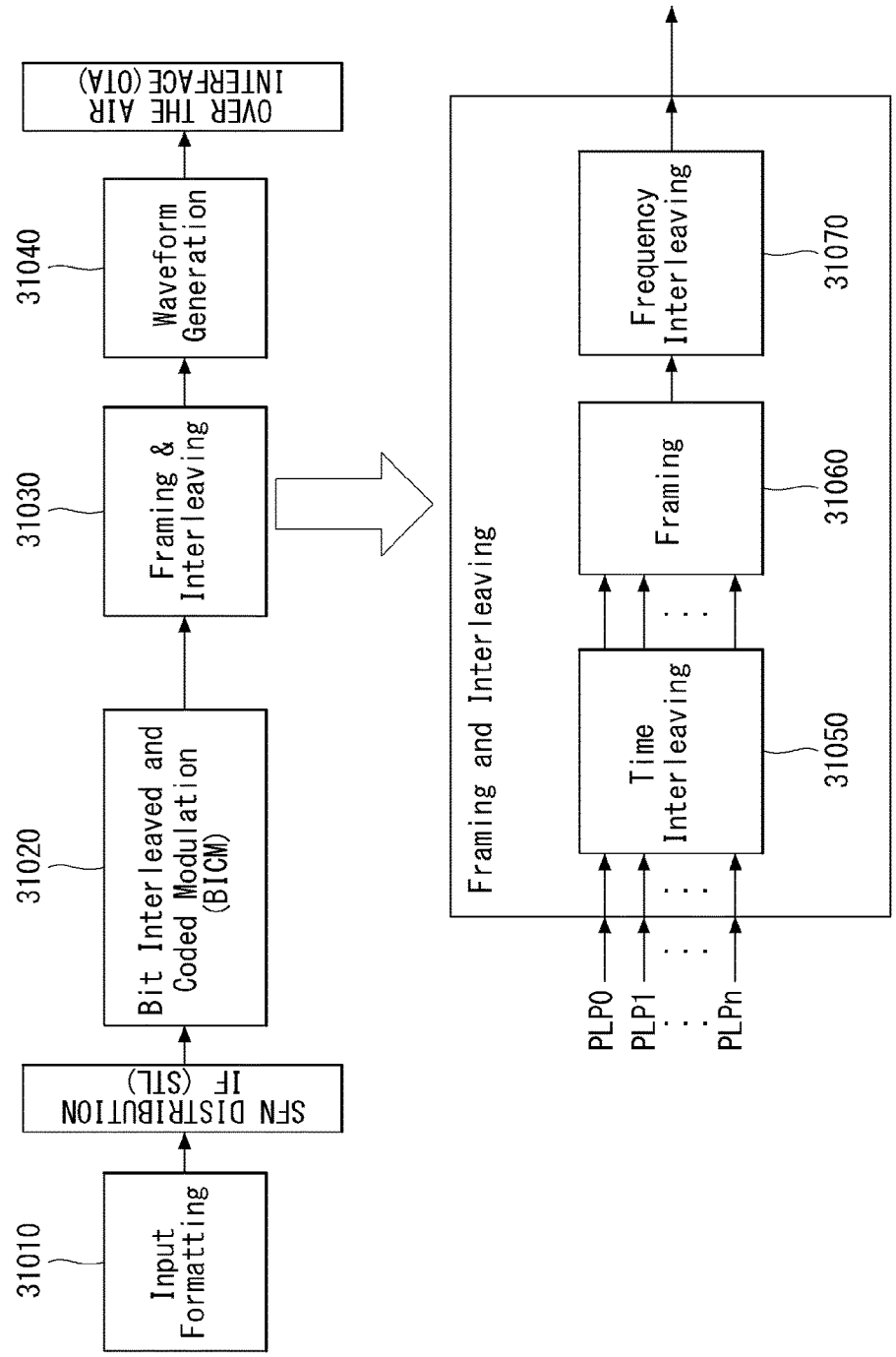
FIG. 31 illustrates a structure of a broadcast signal transmitter according to another embodiment of the present invention.

FIG. 31 illustrates a structure of a broadcast signal transmitter according to another embodiment of the present invention.

The broadcast signal transmitter of FIG. 31 comprises an input formatting block 31010, a BICM (Bit Interleaved and Coded Modulation) block 31020, and a framing & interleaving block 31030, and a waveform generating block 31040. The framing & interleaving block 31030 of FIG. 30 corresponds to the frame building block of FIG. 1, and the waveform generating block 31040 corresponds to the OFDM generating block of FIG. 1.

Different from the embodiments described above, FIG. 31 illustrates the case where the framing building block 1020 includes the time interleaving block 31050, and accordingly, the frame building block 1020 can be called a framing/interleaving block 31050. In other words, the framing/ interleaving block 31030 can further comprise a time interleaving block 31050, a framing block 31060, and a frequency interleaving block 31070. The framing & interleaving block 31030 is capable of performing time interleaving on data by using the aforementioned sub-blocks, generating a signal frame by mapping the time-interleaved data, and performing frequency interleaving.

Except that the time interleaving block 31050 is incorporated into the framing & interleaving block 31030 from the BICM block 31020, other descriptions are the same as given above. The waveform generating block 31040 is the same block as the OFDM generating block 1030 of FIG. 1, only differing in the name.

In the same way for the receiver, the time deinterleaving block is incorporated into the frame parsing block 9010 from the demapping and decoding block 9020 of FIG. 9, and the frame parsing block 9010 can be called a frame parsing & deinterleaving block. The frame parsing block 9010 can perform frequency deinterleaving, frame parsing, and time deinterleaving on a received signal.

FIG. 31 renames the sub-blocks of the system by only changing the inclusion relationship among the sub-blocks, and descriptions about specific operations thereof are the same as given above. In this document, constituting elements of the transmitter and receiver system can be called not only blocks but also modules or units. In what follows, operation of the frequency interleaver 31070 is more elaborated. The frequency interleaver can be installed after the cell mapper of the framing block as a block interleaver.

The frequency interleaver 31070 can obtain additional frequency diversity gain by interleaving cells within a transmission block which forms the unit of a transmission block. In particular, the present invention describes a method for operating the frequency interleaver when a plurality of (data) sub-frames use the same or different FFT size.

FIGS. 32 to 34 illustrate a diagram of a Frequency Interleaving (FI) address generator of a frequency interleaver included in a broadcast transmitter of the present invention.

FIG. 32 illustrates an FI address generator with respect to 32K FFT mode, FIG. 33 illustrates an FI address generator with respect to 16K FFT mode, and FIG. 34 illustrates an FI address generator with respect to 8K FFT mode.

The frequency interleaver uses an address generator according an FFT mode and performs interleaving of the frequency domain by mapping and interpreting cells of a symbol according to the generated random address. In the same way for the receiver, the frequency deinterleaver uses an address generator according to an FFT mode and performs deinterleaving of the frequency domain by mapping and interpreting cells in a reverse order of the transmitter according to the generated random address.

FIG. 32 illustrates an FI address generator with respect to 32K FFT mode according to an embodiment of the present invention.

As shown in FIG. 32, the FI address generator comprises a basic random address generator 32010, a wire permutation block 32020, a symbol offset generator 32030, a modulo operator 32040, an address check block 32050, and a Pseudo-Random Binary Sequence (PRBS) control block 32060. The basic random address generator 32010 comprises a PN generator 32070 and 1-bit toggle block 32080. In what follows, individual parts/blocks will be described.

The basic random address generator 32010 comprises a 1-bit toggling block 32080 and a 14-bit PM generator 32070; and operates to provide a quasi-random sequence/ feature at the time of interleaving.

The wire permutation block 32020 performs permutation of the order of bits when generating a decimal address by using the value of the PRBS register. In the 32K FFT mode, a single wire permutation table is used. The wire permutation table will be described later.

The symbol offset generator 32030 operates on the basis of an OFDM symbol pair unit and outputs a symbol-offset value used when a basic interleaving sequence is cyclic-shifted. The symbol offset generator can output a (N_r−1) bit binary words as symbol offset values. In this case, N_r can be determined as log_2 {M_max}. As an embodiment, the initial value of the symbol offset can be generated/set as (N_r−1) 1s (for example, [1, 1, 1, . . . , 1, 1]).

The modulo operator 32040 can cyclic-shift the combination of the output values of the basic random address generator 32010 and the symbol offset generator 32030 for every two OFDM symbol pairs. The modulo operator 32040 operates when N_max is exceeded, and N_max in the case of 32K FFT mode is 32768 (N_max for 32K FFT=32768).

In case a generated memory address (15 bit) value exceeds the size of an input data vector (N_data), the memory address check block 32050 and the PRBS control block 32060 ignores the output value, but repeatedly controls the basic random address generator 32010 so that the output address value does not exceed N_data. In other words, the address check block 32050 can validate whether an address generated with respect to a frequency-interleaved, particular OFDM symbol falls within the allowable range of RAM address. N_data can represent the number of data carriers of one symbol.

As shown in FIG. 32, the modulo operator 32040 may be referred to as an offset addition block 32040. And offset addition operation of the offset addition block 32040 is always performed before address check of the address check block 32050. Such an operation order can enable a receiver to perform single-memory deinterleaving even if the sizes of data vectors of an OFDM symbol pair are different from each other.

In FIG. 32, the FI address generator is assumed to comprise three generators. In this case, the three generators correspond to a toggle block 32080, an interleaving sequence generator 32070 with the wire permutation block, and a symbol offset generator 32030. And the offset addition block 32040 combines the output values of the three generators and outputs a cyclic-shifted value of the combination.

FIG. 33 illustrates an FI address generator with respect to 16K FFT mode according to an embodiment of the present invention.

As shown in FIG. 33, the FI address generator comprises a basic random address generator 33010, a wire permutation block 33020, a symbol offset generator 33030, a modulo operator 33040, an address check block 33050, and a Pseudo-Random Binary Sequence (PRBS) control block 33060.

The basic random address generator 33010 comprises a PN generator 33070 and 1-bit toggle block 33080. In what follows, individual parts/blocks will be described.

The basic random address generator 33010 comprises a 1-bit toggling block 33080 and a 13-bit PM generator 33070; and operates to provide a quasi-random sequence/feature at the time of interleaving.

The wire permutation block 33020 performs permutation of the order of bits when generating a decimal address by using the value of the PRBS register. In the 16K FFT mode, a single wire permutation table is used. The wire permutation table will be described later.

The symbol offset generator 33030 operates on the basis of an OFDM symbol pair unit and outputs a symbol-offset value used when a basic interleaving sequence is cyclic-shifted. The symbol offset generator can output a (N_r−1) bit binary words as symbol offset values. In this case, N_r can be determined as log_2 {M_max}. As an embodiment, the initial value of the symbol offset can be generated/set as (N_r−1) is (for example, [1, 1, 1, . . . , 1, 1]).

The modulo operator 33040 can cyclic-shift the combination of the output values of the basic random address generator 33010 and the symbol offset generator 33030 for every two OFDM symbol pairs. The modulo operator 33040 operates when N_max is exceeded, and N_max in the case of 16K FFT mode is 16384 (N_max for 16K FFT=16384).

In case a generated memory address (14 bit) value exceeds the size of an input data vector (N_data), the memory address check block 33050 and the PRBS control block 33060 ignores the output value, but repeatedly controls the basic random address generator 33010 so that the output address value does not exceed N_data. In other words, the address check block 33050 can validate whether an address generated with respect to a frequency-interleaved, particular OFDM symbol falls within the allowable range of RAM address. N_data can represent the number of data carriers of one symbol.

As shown in FIG. 33, the modulo operator 33040 may be referred to as an offset addition block 33040. And offset addition operation of the offset addition block 33040 is always performed before address check of the address check block 33050. Such an operation order can enable a receiver to perform single-memory deinterleaving even if the sizes of data vectors of an OFDM symbol pair are different from each other.

In FIG. 33, the FI address generator is assumed to comprise three generators. In this case, the three generators correspond to a toggle block 33080, an interleaving sequence generator 33070 with the wire permutation block, and a symbol offset generator 33030. And the offset addition block 33040 combines the output values of the three generators and outputs a cyclic-shifted value of the combination.

FIG. 34 illustrates an FI address generator with respect to 8K FFT mode according to an embodiment of the present invention.

As shown in FIG. 34, the FI address generator comprises a basic random address generator 34010, a wire permutation block 34020, a symbol offset generator 34030, a modulo operator 34040, an address check block 34050, and a Pseudo-Random Binary Sequence (PRBS) control block 34060. The basic random address generator 34010 comprises a PN generator 34070 and 1-bit toggle block 34080. In what follows, individual parts/blocks will be described.

The basic random address generator 34010 comprises a 1-bit toggling block 34080 and a 12-bit PM generator 34070; and operates to provide a quasi-random sequence/feature at the time of interleaving.

The wire permutation block 34020 performs permutation of the order of bits when generating a decimal address by using the value of the PRBS register. In the 8K FFT mode, a single wire permutation table is used. The wire permutation table will be described later.

The symbol offset generator 34030 operates on the basis of an OFDM symbol pair unit and outputs a symbol-offset value used when a basic interleaving sequence is cyclic-shifted. The symbol offset generator can output a (N_r−1) bit binary words as symbol offset values. In this case, N_r can be determined as log_2 {M_max}. As an embodiment, the initial value of the symbol offset can be generated/set as (N_r−1) 1s (for example, [1, 1, 1, . . . , 1, 1]).

The modulo operator 34040 can cyclic-shift the combination of the output values of the basic random address generator 34010 and the symbol offset generator 34030 for every two OFDM symbol pairs. The modulo operator 34040 operates when N_max is exceeded, and N_max in the case of 16K FFT mode is 8192 (N_max for 8K FFT=8192).

In case a generated memory address (13 bit) value exceeds the size of an input data vector (N_data), the memory address check block 34050 and the PRBS control block 34060 ignores the output value, but repeatedly controls the basic random address generator 34010 so that the output address value does not exceed N_data. In other words, the address check block 34050 can validate whether an address generated with respect to a frequency-interleaved, particular OFDM symbol falls within the allowable range of RAM address. N_data can represent the number of data carriers of one symbol.

As shown in FIG. 34, the modulo operator 34040 may be referred to as an offset addition block 34040. And offset addition operation of the offset addition block 34040 is always performed before address check of the address check block 34050. Such an operation order can enable a receiver to perform single-memory deinterleaving even if the sizes of data vectors of an OFDM symbol pair are different from each other.

In FIG. 34, the FI address generator is assumed to comprise three generators. In this case, the three generators correspond to a toggle block 34080, an interleaving sequence generator 34070 with the wire permutation block, and a symbol offset generator 34030. And the offset addition block 34040 combines the output values of the three generators and outputs a cyclic-shifted value of the combination.

In what follows, a method for FI operation according to a signal frame structure of a transmitted broadcast signal will be described in more detail.

FIG. 35 illustrates a frame structure of a broadcast signal according to an embodiment of the present invention.

As shown in FIG. 35, a signal frame comprises a bootstrap, a preamble, and at least one subframe.

A bootstrap comprises a plurality of symbols, and the FFT size can be fixed to be 2K. The bootstrap symbol can be used for signaling system bandwidth information (6, 7, 8 MHz) of a transmitted signal and information about a preamble structure.

A preamble comprises a plurality of symbols and is always disposed behind the bootstrap and before the first subframe. The FFT size for the preambles can be chosen from 8K, 16K, and 32K. The FFT size used can be the same as or different from the FFT size of the first subframe. The preamble contains L1 signaling information about the remainder of the frame.

One signal frame can comprise at least one subframe. And the FFT size for each subframe can be chosen from 8K, 16K, and 32K, and the FFT size for each subframe can be the same as or different from the FFT size of others. A subframe has a FFT size, GI length, scattered pilot pattern, and Number of useful Carriers (NoC) which are fixed with respect to the corresponding subframe.

FIG. 36 illustrates a frequency interleaving operation on a frame structure of a broadcast signal according to an embodiment of the present invention.

As shown in FIG. 36, frequency interleaving is not used for the bootstrap (symbol). And frequency interleaving is always used for the preamble (symbol). In the case of the data frame, frequency interleaving may or may not be used with respect to each subframe.

Whether to apply frequency interleaving to a subframe can be determined by the L1 signaling information included in the preamble. In other words, the L1 signaling information includes frequency interleaver information (L1D_frequency_interleaver) and indicates whether a frequency interleaver has been enabled or bypassed for the corresponding subframe. The frequency interleaver information (L1D_frequency_interleaver) is a 1-bit flag, which may indicate that the frequency interleaver has been enabled if the flag is 0 or bypassed if it is 1.

FIG. 37 illustrates a method for frequency interleaving a broadcast signal according to one embodiment of the present invention.

FIG. 37 illustrates a method for operating a frequency interleaver with respect to a plurality of subframes and in particular, illustrates the operation of the frequency interleaver under the following three assumptions.

i) FI is enabled for a preamble symbol and subframes (subframe #0~subframe #N−1).

ii) FFT sizes for the preamble and the subframe #0 are the same to each other.

iii) Subframes (subframe#1~subframe #N−1) can have the same or different FFT sizes.

Under the assumptions above, the operation of the frequency interleaver with respect to the preamble, the first subframe (subframe #0), and subsequent subframes (subframe#1~subframe#N−1) can be performed as follows.

i) A single/same frequency interleaver is used for the preamble and the subframe #0. In other words, the symbol offset value of the frequency interleaver is reset (initialized) at the starting part of the preamble. And the symbol offset value changes continuously within the preamble and the first subframe (subframe #0).

ii) A different FI is used for the individual subframes from the second subframe (subframe #1~subframe #N−1). In other words, the symbol offset value of the frequency interleaver is initialized at the starting part of each subframe.

Initialization of the symbol offset value of the frequency interleaver can be described as the symbol offset generator and the interleaving sequence generator of the frequency interleaver are being reset. The symbol offset value can be initialized by resetting the symbol offset generator. For example, in case the initial value of the symbol offset is 0, the symbol offset may be reset to 0. As a different example, as described above, the symbol offset can be reset to the initial value ([1, 1, 1, . . . , 1, 1]) of a bit binary word corresponding to (N_r−1) 1s.

A signal frame according to the present embodiment can include a preamble of 32K FFT mode and the first subframe of 32K FFT mode. In this case, the frequency interleaver may not impose evenness or oddness on the number of 32K mode preambles. In other words, while a limit is not imposed on the number of preambles, the number of data symbols of the 32K mode subframes may be adjusted so that the number of the entire symbols can be even-numbered. In this case, since the number of the entire symbols of the preamble and the first subframe becomes even-numbered, single-memory deinterleaving can be ensured.

FIG. 38 illustrates a method for frequency interleaving a broadcast signal according to one embodiment of the present invention.

FIG. 38 illustrates a method for operating a frequency interleaver with respect to a plurality of subframes and illustrates the operation under three assumptions as in the embodiment of FIG. 37.

i) FI is enabled for a preamble symbol and subframes (subframe #0~subframe #N−1).

ii) FFT sizes for the preamble and the subframe #0 are the same to each other.

iii) Subframes (subframe#1~subframe #N−1) can have the same or different FFT sizes.

Under the assumptions above, the operation of the frequency interleaver with respect to the preamble, the first subframe (subframe #0), and subsequent subframes (subframe#1~subframe#N−1) can be performed as follows.

i) A different frequency interleaver is used for the preamble and the subframe #0. In other words, the symbol offset value of the frequency interleaver is reset (initialized) at the starting part of the preamble and at the starting part of the first subframe.

ii) A different FI is used for the individual subframes from the second subframe (subframe #1~subframe #N−1). In other words, the symbol offset value of the frequency interleaver is initialized at the starting part of each subframe.

Initialization of the symbol offset value of the frequency interleaver can be described as the symbol offset generator and the interleaving sequence generator of the frequency interleaver are being reset. The symbol offset value can be initialized by resetting the symbol offset generator.

As in the embodiment of FIG. 38, in case the frequency interleaver is reset for the preamble and each subframe, the symbol offset for the first symbol of the preamble and the subframes can be set to the initial value. For example, in case the initial value of the symbol offset is 0, the symbol offset may be set to 0. As another example, as described above, the symbol offset can be reset to the initial value of the bit binary word corresponding to (N_r−1) 1s. Therefore, the receiver can perform frequency interleaving promptly without calculating the symbol offset value for each of the preamble and the subframes. In particular, in case each subframe corresponds to a particular service, the efficiency of signal processing on the basis of subframe units for decoding the particular service can be improved.

In what follows, the frequency deinterleaving operation at the receiver will be described.

FIG. 39 illustrates a frame parsing block according to one embodiment of the present invention.

As shown in FIG. 39, the frame parsing block can comprise a block deinterleaver and a cell demapper. In particular, the block deinterleaver may perform frequency deinterleaving. As described above, the frame parsing block may be called a frame parsing & deinterleaving block. In this case, the frame parsing block frequency deinterleaves the signal processed in the synchronization & demodulation block and performs frame parsing. Frame parsing may be called cell demapping. The cell demapper can extract the cells corresponding to the L1 signaling information or the cells corresponding to particular PLP data and output the extracted cells to the demapping & decoding block.

In FIG. 39, the frequency interleaver can restore the original data order by performing the reverse process of the interleaving process of the frequency interleaver described above. Also, the frequency interleaver can comprise the address generator having the structure illustrated in FIGS. 32 to 34.

Figure 40:
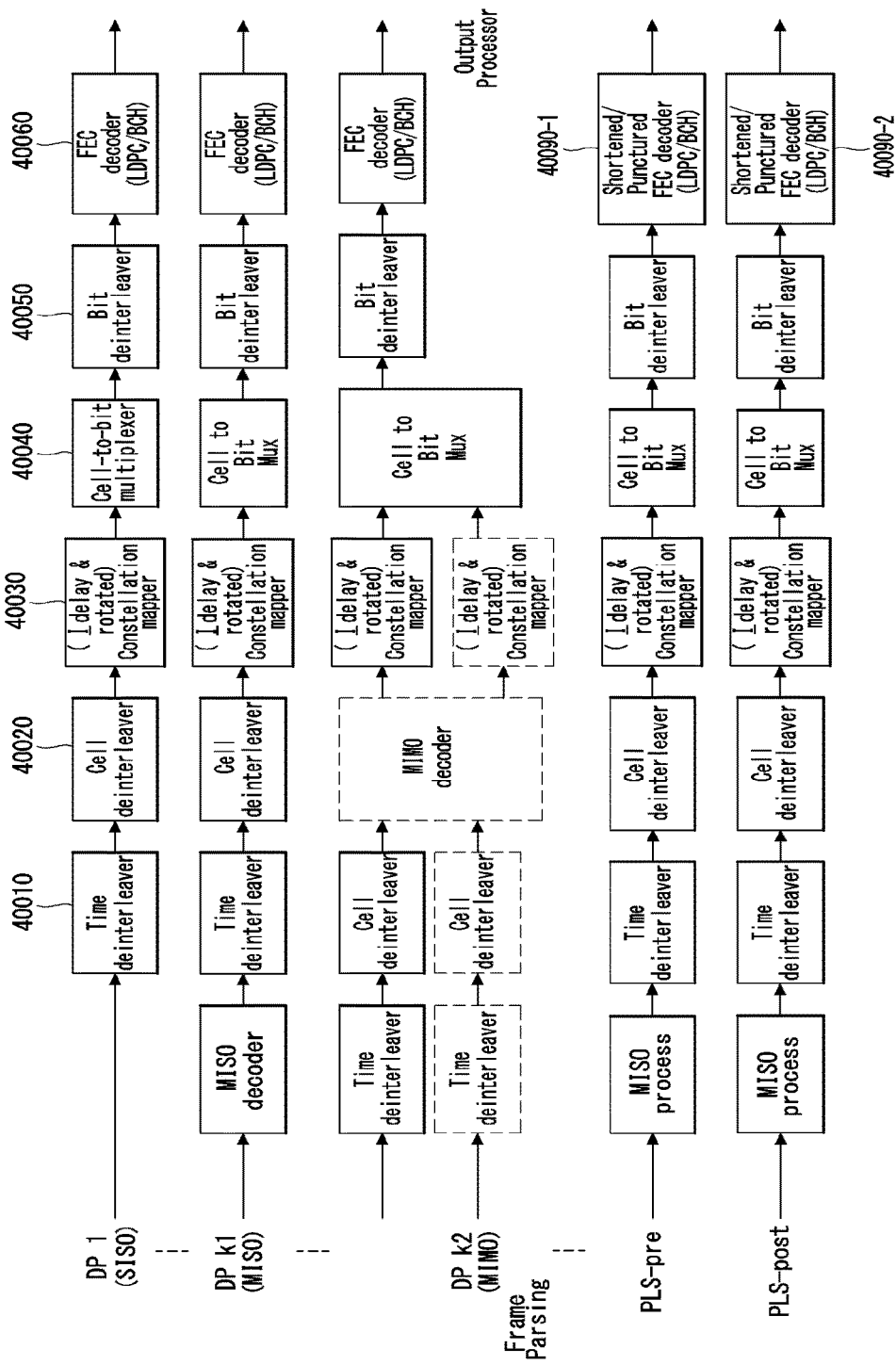
FIG. 40 illustrates a demapping & decoding block according to one embodiment of the present invention.

FIG. 40 illustrates a demapping & decoding block according to one embodiment of the present invention.

FIG. 40 illustrates a detailed block diagram of a demapping & decoding block according to an embodiment of the present invention.

The demapping & decoding module of FIG. 40 corresponds to one embodiment of the demapping & decoding module 9020 of FIG. 9.

As described above, the coding & modulation module of a transmitter according to one embodiment of the present invention can process input PLPs according to the respective paths by independently applying the SISO, MISO, and MIMO scheme. Therefore, the demapping & decoding module shown in FIG. 40 can also include blocks for processing the data output from the frame parser in accordance with a transmitting apparatus in the SISO, MISO, and MIMO scheme.

As shown in FIG. 40, the demapping & decoding module according to one embodiment of the present invention comprises a first block for the SISO scheme, a second block for the MISO scheme, a third block for the MIMO scheme, and a fourth block for processing PLS pre/post information.

The block for processing an input PLP according to the SISO scheme can comprises a time deinterleaver block 40010, a cell deinterleaver block 40020, a constellation demapper block 40030, a cell-bit demultiplexer block 40040, a bit deinterleaver block 40050, and an FEC decoder block 40060.

The time deinterleaver block 40010 can perform the reverse process of the time interleaver block. In other words, the time deinterleaver block 40010 can deinterleave the input symbol interleaved in the time domain into its original position.

The cell deinterleaver block 40020 can perform the reverse process of the cell interleaver block. In other words, the cell deinterleaver block 40020 can deinterleave the positions of the cells spread within one FEC block into their original positions.

The constellation demapper block 40030 can perform the reverse process of the constellation mapper block. In other words, the constellation demapper block 40030 can demap the input signal of the symbol domain into the data of the bit domain. Also, the constellation demapper block 40030 can output bit data determined by performing a hard decision and output a Log-Likelihood Ratio (LLR) of each bit corresponding to a decision value or a probabilistic value. If the transmitter applies a rotated constellation to get an additional diversity gain, the constellation demapping block 40030 can perform two-dimensional LLR demapping corresponding to the rotated constellation. The constellation demapper block 40030 can perform calculation of the LLR so that a transmitting apparatus can compensate the delay with respect to the I or Q component.

The cell-bit multiplexer block 40040 can perform the reverse process of the bit-to-cell demultiplexer block. In other words, the cell-bit multiplexer block 40040 can restore the bit data mapped by the bit-to-cell demultiplexer into the original bit stream form.

The bit deinterleaver block 40050 can perform the reverse process of the bit interleaver block. In other words, the bit deinterleaver block 40050 can deinterleave the bit stream output from the cell-to-bit multiplexer block 40040 into the bit stream of the original order.

The FEC decoder block 40060 can perform the reverse process of the FEC encoder block. In other words, the FEC decoder block 40060 can correct an error generated in a signal received through a transmission channel by performing LDPC decoding and BCH decoding.

In what follows, described will be only those additional blocks not described in the signal processing based on the SISO mode.

The MISO decoder block 40070 can perform the reverse process of the MISO processing block. In case a broadcast transmitting & receiving system according to one embodiment of the present invention corresponds to a system based on the STBC, the MISO decoder block 40070 can perform Alamouti decoding.

The MIMO decoding block 40080 can receive output data of the cell deinterleaver with respect to m receiving antenna input signals and perform MIMO decoding as a reverse process of the MIMO processing block. The MIMO decoding block 40080 can perform maximum likelihood decoding or simplified sphere decoding to achieve the best decoding performance. Or the MIMO decoding block 40080 can perform MMSE detection or perform the MMSE detection together with iterative decoding to secure improved decoding performance.

The FEC decoder blocks 40090-1, 40090-2 (Shortened/Punctured FEC decoder) which processes signaling information can perform the reverse process of the Shortened/punctured FEC encoder block. In other words, the Shortened/Punctured FEC decoder 40090 can perform FEC decoding after additionally performing de-shortening and de-puncturing on the data received after being shortened/punctured according to the length of PLS data. In this case, since the FEC decoder used for a data pipe can also be used in the same way for the PLS, no separate FEC decoder hardware intended only for the PLS is needed; therefore, system design can be done with ease and efficient coding can be made possible.

The blocks described above can be omitted according to the designer's intent or replaced with other blocks having a similar or the same function.

In what follows, described will be the operation of a frequency deinterleaver of a receiver according to the frame structure described above. The overall frequency deinterleaving process is performed in the reverse order of the interleaving process. And the FI address generator/random address generator used in the receiver may be the same as the FI address generator/random address generator of the transmitter. The memory requirement of the maximum frequency deinterleaver may be 32K. The receiver can perform deinterleaving by generating an address by generating a sequence/offset for frequency deinterleaving by using the FI address generator having the same structure as in the transmitter; and recording/interpreting the data in the reverse order of the transmitter according to the generated address.

Figure 41:
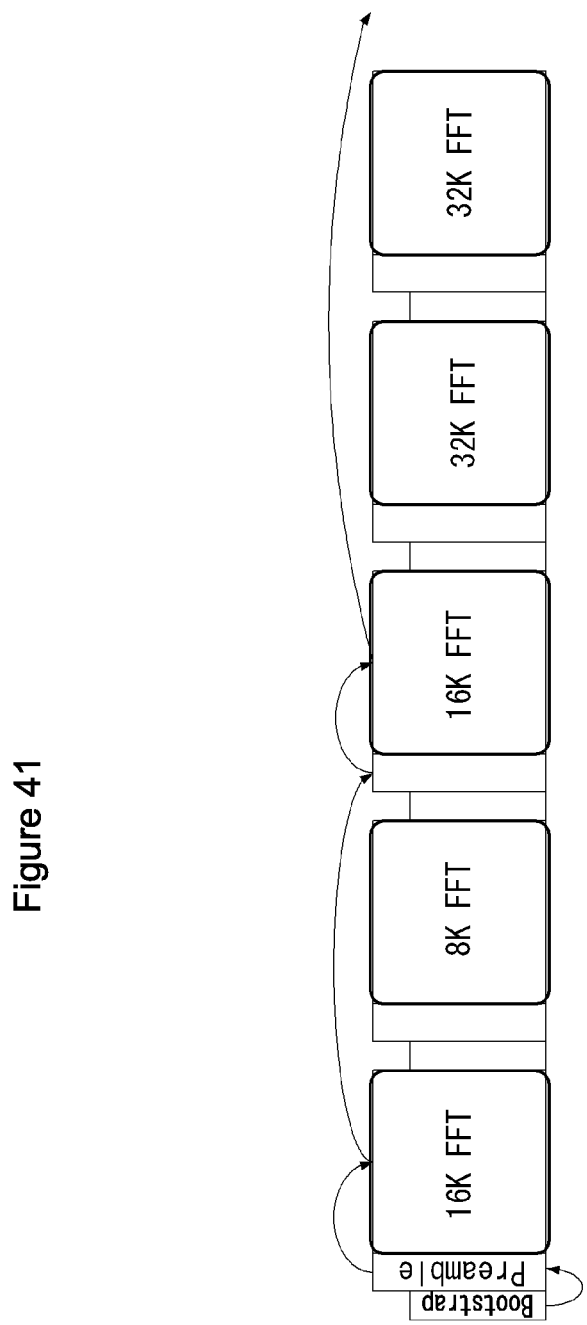
FIG. 41 illustrates a signal processing and deinterleaving process of a receiver according to one embodiment of the present invention.

FIG. 41 illustrates a signal processing and deinterleaving process of a receiver according to one embodiment of the present invention.

FIG. 41 illustrates an embodiment of a case where a signal frame has one subframe. In other words, the individual signal frames of FIG. 41 have a bootstrap, preamble, and one subframe. The FFT size of a subframe can be the same as or different from the FFT size of the preamble. The embodiment of FIG. 41 assumes the situation that the frequency interleaver has been activated with respect to the preamble symbol and subframes, namely, the frequency interleaving has been performed thereon. Also, the FFT sizes of the subframes of each signal frame can be the same as or different from each other.

As shown in FIG. 41, the receiver first decodes the bootstrap and decodes the preamble by using the information obtained from decoding the bootstrap. And the receiver decodes the data of the subframes by using the L1 signaling information contained in the preamble. The receiver may extract a frame/subframe/PLP with respect to a desired service and decode the data corresponding to the desired service.

The receiver frequency-deinterleaves the preamble and optionally frequency-deinterleaves the subframes on the basis of the L1 information contained in the preamble. As described above, when deinterleaving the preamble and the subframes, the receiver can reset the symbol offset values at the starting part of the preamble and the subframes. In other words, the frequency interleaver can be reset with respect to the first symbol of the preamble and the first symbol of the subframes, respectively.

Figure 42:
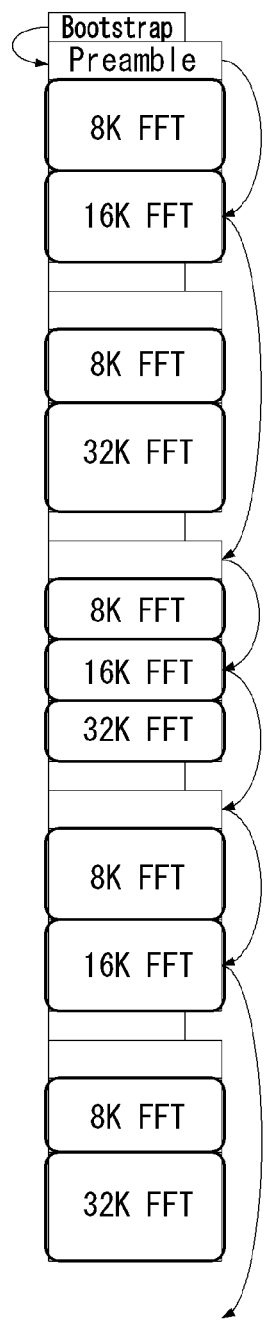
FIG. 42 illustrates a signal processing and deinterleaving process of a receiver according to one embodiment of the present invention.

FIG. 42 illustrates a signal processing and deinterleaving process of a receiver according to one embodiment of the present invention.

FIG. 42 illustrates an embodiment of a case where a signal frame has one subframe. In other words, the individual signal frames of FIG. 41 have a bootstrap, preamble, and a plurality of subframes. The FFT size of a subframe can be the same as or different from the FFT size of the preamble. The embodiment of FIG. 42 assumes the situation that the frequency interleaver has been activated with respect to the preamble symbol and subframes, namely, the frequency interleaving has been performed thereon. Also, the FFT sizes of the subframes of each signal frame can be the same as or different from each other.

As shown in FIG. 42, the receiver first decodes the bootstrap and decodes the preamble by using the information obtained from decoding the bootstrap. And the receiver decodes the data of the subframes by using the L1 signaling information contained in the preamble. The receiver may extract a subframe/PLP with respect to a desired service and decode the data corresponding to the desired service.

The receiver frequency-deinterleaves the preamble and optionally frequency-deinterleaves the subframes on the basis of the L1 information contained in the preamble. As described above, when deinterleaving the preamble and the subframes, the receiver can reset the symbol offset values at the starting part of the preamble and the subframes. In other words, the frequency interleaver can be reset with respect to the first symbol of the preamble and the first symbol of the subframes, respectively.

FIG. 43 is a flow diagram illustrating a method for transmitting a broadcast signal of a broadcast signal transmitter according to an embodiment of the present invention.

As described with respect to the broadcast signal transmitter and its operation, the broadcast signal transmitter can input process input data by using the input formatting module and output at least one Data Pipe (DP), namely, Physical Layer Pipe (PLP) data S43010. And the broadcast signal transmitter can perform error-correction processing or FEC encoding on the data contained in the at least one PLP by using the BICM module S43020. The broadcast signal transmitter can generate a signal frame containing data of at least one PLP by using the framing module S43030. The broadcast signal transmitter can frequency interleave the data contained in the signal frame by using the frequency interleaver S43040. And the broadcast signal transmitter can generate an OFDM-modulated transmission signal by using the waveform generating module S43050.

As described above, a signal frame comprises a bootstrap, preamble, and at least one subframe. And the frequency interleaver is always capable of frequency interleaving the preamble symbol, and the subframe symbol can be frequency-interleaved optionally. In case the frequency interleaver is applied to the subframe, frequency interleaver information can be transmitted being included in the L1 signaling information through the preamble.

In case frequency interleaving is performed on at least one subframe and preamble, as illustrated in FIGS. 35 to 38, the symbol offset generator can be reset at the starting part of the preamble and the starting part of the subframe. In particular, in the case of a plurality of subframes, the symbol offset generator can be reset at the starting part of the respective subframes. The starting part of the preamble and that of the subframe denotes the first symbol of the preamble and the first symbol of the subframe, respectively. In other words, the symbol offset generator can be reset at the first symbol of each subframe and reset at the first symbol of the preamble.

As shown in FIGS. 32 to 34, the frequency interleaving can further comprise generating a symbol offset. The symbol offset generator generates a new symbol offset for every symbol pair, and a symbol pair comprises two consecutive symbols.

The frequency interleaving can further comprise offset adding and address checking. In this case, the address checking block validates an output address of the offset adding.

FIG. 44 illustrates a method for receiving a broadcast signal of a broadcast signal receiver according to one embodiment of the present invention.

As described with respect to the broadcast signal receiver and its operation, the broadcast signal receiver can OFDM demodulate a received broadcast signal by using the synchronization & demodulation module S44010. The broadcast signal receiver can perform frequency deinterleaving on a broadcast signal by using the frequency deinterleaver S44020. The broadcast signal receiver can parse a signal frame of a broadcast signal by using the frame parsing module S44030. The broadcast signal receiver can extract and decode preamble data contained in a signal frame; and extract a desired subframe or PLP data by using the L1 signaling information obtained from the preamble data. The broadcast signal receiver can convert the PLP data extracted from a broadcast signal to the bit domain by using the demapping & decoding module; and perform FEC decoding on the converted PLP data S44040. And the broadcast signal receiver can output the PLP data as a data stream by using the output processing module S44050.

As described above, a signal frame comprises a bootstrap, preamble, and at least one subframe. And the frequency deinterleaver is always capable of frequency deinterleaving the preamble symbol, and the subframe symbol can be frequency-deinterleaved optionally. In case the frequency interleaver is applied to the subframe, frequency interleaver information can be transmitted being included in the L1 signaling information through the preamble. And the broadcast signal receiver can selectively frequency-deinterleave the subframe symbol on the basis of the frequency interleaver information.

In case frequency deinterleaving is performed on at least one subframe and preamble, as illustrated in FIGS. 35 to 42, the symbol offset generator of the frequency deinterleaver can be reset at the starting part of the preamble and the starting part of the subframe. In particular, in the case of a plurality of subframes, the symbol offset generator can be reset at the starting part of the respective subframes. The starting part of the preamble and that of the subframe denotes the first symbol of the preamble and that of the subframe, respectively. In other words, the symbol offset generator can be reset at the first symbol of each subframe and reset at the first symbol of the preamble.

As described above, the frequency deinterleaver of a broadcast receiver can comprise an address generator having the structure as shown in FIGS. 32 to 34, and perform frequency deinterleaving by using the address generator. Therefore, the frequency deinterleaving can further comprise generating a symbol offset. The symbol offset generator generates a new symbol offset for every symbol pair, and a symbol pair comprises two consecutive symbols.

The frequency deinterleaving can further comprise offset adding and address checking. In this case, the address checking block validates an output address of the offset adding.

According to the present invention, since the frequency interleaver is reset for each subframe, data independence of the subframe can be enhanced. Therefore, in case a receiver processes data in units of subframes, data processing efficiency and speed can be enhanced. Since the receiver is capable of performing frequency deinterleaving on each subframe by directly resetting the offset value without using separate signaling information, latency due to signal processing can be reduced, and system complexity can be reduced. Also, by always performing frequency interleaving on the preamble, the preamble can be transmitted and received in a more robust manner. And since frequency interleaving/deinterleaving can be applied optionally to subframes, flexibility of system operation is improved, and Frequency Division Multiplexing (FDM) can be used for individual subframes. And using a new offset in units of symbol pair, the symbol offset generator can improve memory usage performance at the time of interleaving/deinterleaving. Also, since address checking is performed after an offset is generated, memory error can be reduced, and even if data vector sizes of an OFDM symbol pair are different from each other, the receiver can still perform single-memory deinterleaving. In particular, in case address checking is performed first, a validated address may leave the memory range due to offset addition; therefore, address checking has to be performed after the offset addition is performed.

In the specification, methods and apparatuses for receiving and transmitting a broadcast signal are used.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. A broadcast signal receiver comprising:
  a demodulator configured to demodulate a received broadcast signal;
  a frequency deinterleaver configured to deinterleave a signal frame comprised in the demodulated broadcast signal;
  a de-framer configured to de-frame the deinterleaved signal frame and to output Physical Layer Pipe (PLP) data of the signal frame;
  a constellation demapper configured to perform constellation demapping on the outputted PLP data;
  a bit deinterleaver configured to deinterleave the PLP data on which the constellation demapping is performed;

a decoder configured to perform error correction decoding on the deinterleaved PLP data;

wherein the signal frame comprises a preamble and at least one subframe, wherein a symbol offset generator of the frequency deinterleaver is reset on a first symbol of the preamble, wherein the symbol offset generator of the frequency deinterleaver is reset on a first symbol of a second subframe and subsequent subframes except a first subframe, the first subframe being a subframe which immediately follows the preamble, wherein the frequency deinterleaver always deinterleaves the preamble and optionally deinterleaves each of the at least one subframe, and wherein the preamble comprises frequency interleaver information indicating whether frequency-interleaving has been performed or not for the subframe.

2. The broadcast signal receiver of claim 1, wherein a same Fast Fourier Transform (FFT) size is used for the preamble and the first subframe.

3. The broadcast signal receiver of claim 1, wherein the symbol offset generator generates a new symbol offset for every symbol pair and the symbol pair comprises two consecutive symbols.

4. The broadcast signal receiver of claim 1, wherein the frequency deinterleaver further comprises a random address generator, a wire permutation block, an offset addition block, and an address check block, and wherein the offset addition block generates a deinterleaving address by using permutated random address and symbol offset and the address check block validates the deinterleaving address.

5. A method for receiving a broadcast signal, comprising:
demodulating a received broadcast signal;
frequency-deinterleaving a signal frame comprised in the demodulated broadcast signal;
de-framing the frequency-deinterleaved signal frame and to output Physical Layer Pipe (PLP) data of the signal frame;
performing constellation demapping on the outputted PLP data;
bit-deinterleaving the PLP data on which the constellation demapping is performed;
performing error correction decoding on the bit-deinterleaved PLP data;

wherein the signal frame comprises a preamble and at least one subframe, wherein symbol offset generating of the frequency-deinterleaving is reset on a first symbol of the preamble, wherein the symbol offset generating of the frequency-deinterleaving is reset on a first symbol of a second subframe and subsequent subframes except a first subframe, the first subframe being a subframe which immediately follows the preamble, wherein the frequency deinterleaving is always performed on the preamble and optionally performed on each of the at least one subframe, and wherein the preamble comprises frequency interleaver information indicating whether frequency-interleaving has been performed or not for the subframe.

6. The method of claim 5, wherein a same Fast Fourier Transform (FFT) size is used for the preamble and the first subframe.

7. The method of claim 5, wherein the symbol offset generating generates a new symbol offset for every symbol pair and the symbol pair comprises two consecutive symbols.

8. The method of claim 5, wherein the frequency-deinterleaving further comprises random address generating, wire permutating, offset adding, and address checking, and wherein the offset adding generates a frequency deinterleaving address by using permutated random address and symbol offset and the address checking validates the frequency deinterleaving address.

* * * * *